US012257911B2

(12) United States Patent
Kinomura

(10) Patent No.: US 12,257,911 B2
(45) Date of Patent: Mar. 25, 2025

(54) ELECTRICALLY-POWERED VEHICLE, ENERGY SUPPLY APPARATUS, AND ENERGY SUPPLY SYSTEM

(71) Applicant: TOYOTA JIDOSHA KABUSHIKI KAISHA, Toyota (JP)

(72) Inventor: Shigeki Kinomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 346 days.

(21) Appl. No.: 17/669,653

(22) Filed: Feb. 11, 2022

(65) Prior Publication Data

US 2022/0274491 A1 Sep. 1, 2022

(30) Foreign Application Priority Data

Feb. 25, 2021 (JP) .................................. 2021-029196

(51) Int. Cl.
*B60L 9/00* (2019.01)
*B60L 50/61* (2019.01)
*B60L 50/71* (2019.01)

(52) U.S. Cl.
CPC ............... *B60L 50/61* (2019.02); *B60L 50/71* (2019.02); *B60L 2240/70* (2013.01)

(58) Field of Classification Search
CPC .......... B60L 50/60; B60L 50/61; B60L 53/66; B60L 50/70; B60L 50/71; B60L 53/11; B60L 2240/70
See application file for complete search history.

(56) References Cited

U.S. PATENT DOCUMENTS

| 2014/0300808 A1* | 10/2014 | Pan ......................... G03B 17/14 348/373 |
| 2014/0316939 A1 | 10/2014 | Uyeki |
| 2018/0037125 A1* | 2/2018 | Penilla .................... B60L 58/21 |
| 2019/0294135 A1* | 9/2019 | Madrid .............. G05B 19/0426 |
| 2021/0311719 A1* | 10/2021 | Weis ....................... B60L 53/12 |

FOREIGN PATENT DOCUMENTS

| EP | 3 661 801 | 6/2020 |
| JP | 2011-33068 A | 2/2011 |
| JP | 2014-212690 A | 11/2014 |
| JP | 2016-15796 A | 1/2016 |
| JP | 2016015796 A * | 1/2016 |
| JP | 2018-074616 A | 5/2018 |
| WO | 2011/012937 A1 | 2/2011 |
| WO | 2013/099587 A1 | 7/2013 |

* cited by examiner

*Primary Examiner* — Adam M Alharbi
(74) *Attorney, Agent, or Firm* — Sughrue Mion, PLLC

(57) ABSTRACT

An electrically-powered vehicle supplements energy independently from each of a plurality of supply apparatuses that supply the energy. The electrically-powered vehicle includes a controller. The controller is configured to hold a plurality of pieces of vehicle control software, associated with at least two of pieces of control software of each of the plurality of supply apparatuses, and, when the energy is supplemented from any one supply apparatus of the plurality of supply apparatuses, select vehicle control software associated with control software of the any one supply apparatus from among the plurality of pieces of vehicle control software.

10 Claims, 15 Drawing Sheets

FIG. 3A

| VEHICLE MODEL ID | VEHICLE CONTROL SOFTWARE | VERSION | DATE OF RELEASE |
|---|---|---|---|
| E1 | E1 CONTROL PROGRAM | V1 | 20/01/08 |
| E1 | E1 CONTROL PROGRAM | V2 | 20/07/08 |
| E1 | E1 CONTROL PROGRAM | V3 | 20/11/08 |
| ⋮ | ⋮ | ⋮ | ⋮ |

FIG. 3B

| FIRST SUPPORT TABLE | | VEHICLE MODEL ID |
|---|---|---|
| | | E1 |
| STATION MODEL ID | S1 | E1*S1 |
| | S2 | E1*S2 |
| | ⋮ | … |

FIG. 3C

SECOND SUPPORT TABLE (E1*S2)

| | | VEHICLE MODEL ID "E1" | | |
|---|---|---|---|---|
| | VERSION | V1 | V2 | V3 |
| STATION MODEL ID "S2" | V1 | YES | NO | … |
| | V2 | NO | YES | NO |
| | ⋮ | … | … | … |

FIG. 6

| VEHICLE MODEL ID | VEHICLE CONTROL SOFTWARE | VERSION | DATE OF RELEASE |
|---|---|---|---|
| E1 | E1 CONTROL PROGRAM | V1 | 20/01/08 |
| E1 | E1 CONTROL PROGRAM | V2 | 20/07/08 |
| E1 | E1 CONTROL PROGRAM | V3 | 20/11/08 |
| E1 | E1 CONTROL PROGRAM | V4 | 21/1/08 |
| : | : | : | : |
| E2 | E2 CONTROL PROGRAM | V1 | 20/05/07 |
| E2 | E2 CONTROL PROGRAM | V2 | 20/11/07 |
| : | : | : | : |

FIG. 8

| STATION MODEL ID | CONTROL SOFTWARE | VERSION | DATE OF RELEASE |
|---|---|---|---|
| S1 | S1 CONTROL PROGRAM | V1 | 20/01/08 |
| S1 | S1 CONTROL PROGRAM | V2 | 20/07/08 |
| S1 | S1 CONTROL PROGRAM | V3 | 20/11/08 |
| S1 | S1 CONTROL PROGRAM | V4 | 21/1/08 |
| ⋮ | ⋮ | ⋮ | ⋮ |
| S2 | S2 CONTROL PROGRAM | V1 | 19/05/07 |
| S2 | S2 CONTROL PROGRAM | V2 | 20/07/09 |
| S2 | S2 CONTROL PROGRAM | V3 | 20/11/07 |
| S2 | S2 CONTROL PROGRAM | V4 | 21/1/09 |
| ⋮ | ⋮ | ⋮ | ⋮ |

FIG. 10A

| STATION MODEL ID | CONTROL SOFTWARE | VERSION | DATE OF RELEASE |
|---|---|---|---|
| S1 | S1 CONTROL PROGRAM | V1 | 20/01/08 |
| S1 | S1 CONTROL PROGRAM | V2 | 20/07/08 |
| : | : | : | : |

FIG. 10B

| FIRST SUPPORT TABLE | | VEHICLE MODEL ID | | |
|---|---|---|---|---|
| | | E1 | E2 | ... |
| STATION MODEL ID | S1 | E1*S1 | E2*S1 | ... |

FIG. 10C

| SECOND SUPPORT TABLE (E1*S1) | | VEHICLE MODEL ID "E1" | | |
|---|---|---|---|---|
| | VERSION | V1 | V2 | V3 |
| STATION MODEL ID "S1" | V1 | YES | NO | YES |
| | V2 | NO | YES | NO |
| | : | ... | ... | ... |

FIG. 11A

| STATION MODEL ID | CONTROL SOFTWARE | VERSION | DATE OF RELEASE |
|---|---|---|---|
| S2 | S2 CONTROL PROGRAM | V1 | 19/05/07 |
| S2 | S2 CONTROL PROGRAM | V2 | 20/07/09 |
| : | : | : | : |

FIG. 11B

| FIRST SUPPORT TABLE | | VEHICLE MODEL ID | | |
|---|---|---|---|---|
| | | E1 | E2 | ... |
| STATION MODEL ID | S2 | E1*S2 | E2*S2 | ... |

FIG. 11C

| SECOND SUPPORT TABLE (E1*S2) | | VEHICLE MODEL ID "E1" | | |
|---|---|---|---|---|
| | VERSION | V1 | V2 | ... |
| STATION MODEL ID "S2" | V1 | YES | NO | ... |
| | V2 | NO | YES | ... |
| | : | ... | ... | ... |

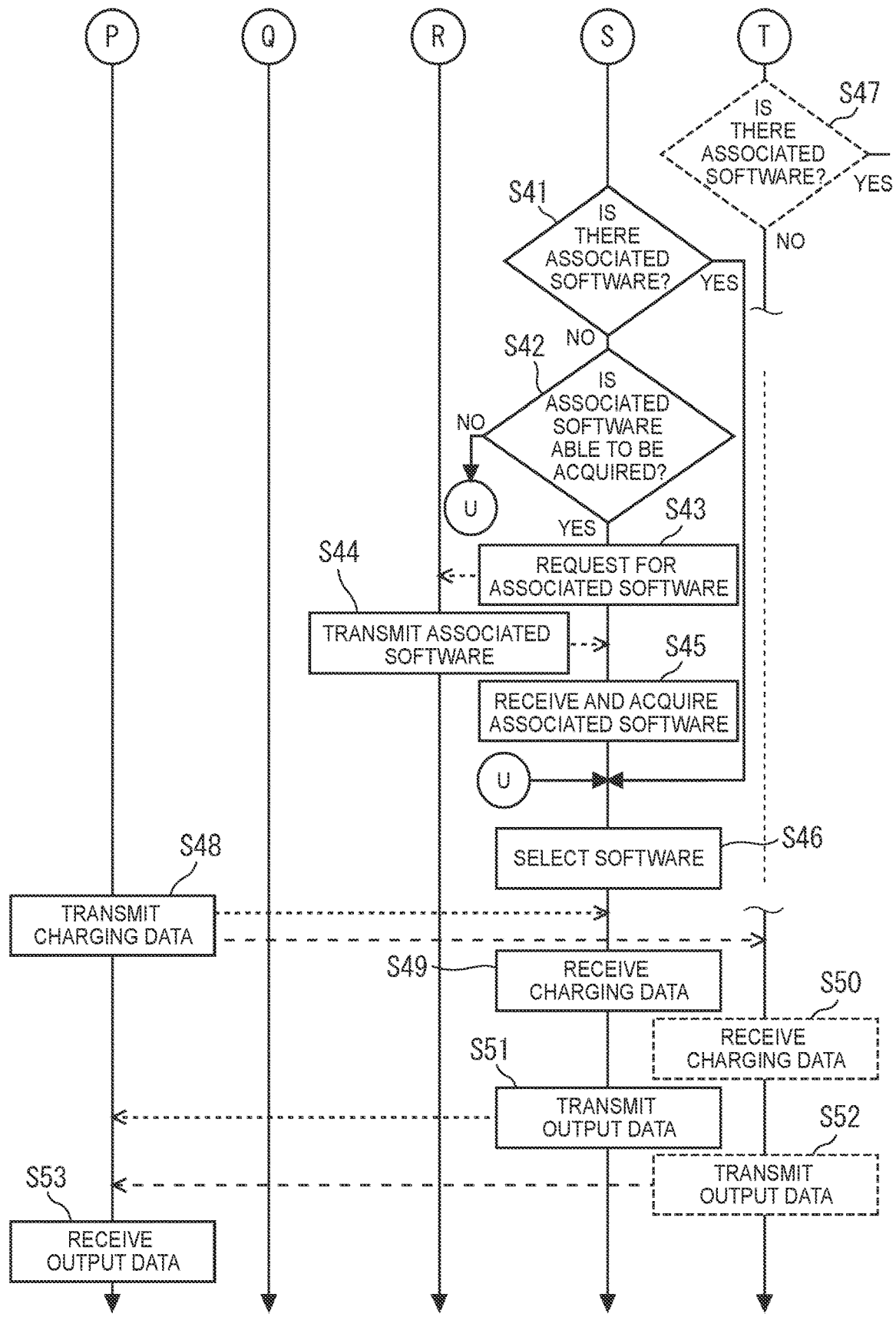

ELECTRICALLY-POWERED VEHICLE, ENERGY SUPPLY APPARATUS, AND ENERGY SUPPLY SYSTEM

CROSS-REFERENCE TO RELATED APPLICATION

This application claims priority to Japanese Patent Application No. 2021-029196 filed on Feb. 25, 2021, incorporated herein by reference in its entirety.

BACKGROUND

1. Technical Field

The present disclosure relates to an electrically-powered vehicle, an energy supply apparatus, and an energy supply system.

2. Description of Related Art

There is known a technology that a server provides an electric vehicle with charging station information including information on the locations of charging stations, availability, and accessibility. Charging station information includes compatibility (for example, plug type support) between a charging station and an electric vehicle as availability (see, for example, Japanese Unexamined Patent Application Publication No. 2014-212690 (JP 2014-212690A)).

SUMMARY

Compatibility between an energy supply apparatus including a charging station and an electrically-powered vehicle including an electric vehicle is not only hardware compatibility, such as a plug type, but also software compatibility, such as a program for controlling the energy supply apparatus or the electrically-powered vehicle.

For an energy supply apparatus installed in a place, such as a public facility and a commercial facility, the energy supply apparatus can be updated to the latest state when the server periodically provides latest software to the energy supply apparatus via, for example, wired communication. When the server provides an electrically-powered vehicle with software for electrically-powered vehicles, having compatibility with the latest software, via, for example, wireless communication, the electrically-powered vehicle can be supplied with energy from the energy supply apparatus updated to the latest state to supplement energy.

However, an energy supply apparatus installed at home or the like where the frequency of use of an electrically-powered vehicle is high may irregularly acquire latest software from the server by manual operation. When forget to acquire the latest software, the electrically-powered vehicle provided with the software for electrically-powered vehicles and the energy supply apparatus installed at home or the like may not support each other, and the electrically-powered vehicle may not be able to supplement energy from the energy supply apparatus.

The present disclosure provides an electrically-powered vehicle, an energy supply apparatus, and an energy supply system that avoids a situation in which two pieces of software that respectively control supply and supplement of energy do not support each other.

An aspect of the present disclosure relates to an electrically-powered vehicle. The electrically-powered vehicle supplements energy independently from each of a plurality of supply apparatuses that supply the energy. The electrically-powered vehicle includes a controller. The controller is configured to hold a plurality of pieces of vehicle control software, associated with at least two of pieces of control software of each of the plurality of supply apparatuses, and, when the energy is supplemented from any one supply apparatus of the plurality of supply apparatuses, select vehicle control software associated with control software of the any one supply apparatus from among the plurality of pieces of vehicle control software.

In the above configuration, the controller may be configured to, when the controller does not hold the vehicle control software associated with the control software of the any one supply apparatus, acquire and select the vehicle control software associated with the control software of the any one supply apparatus from a server capable of communicating with the electrically-powered vehicle.

In the above configuration, the electrically-powered vehicle may further include a secondary battery as a power supply, and the plurality of supply apparatuses may be configured to supply electric power as the energy.

In the above configuration, the electrically-powered vehicle may further include a fuel cell as a power supply, and the fuel cell may use hydrogen, and the plurality of supply apparatuses may be configured to supply the hydrogen as the energy.

Another aspect of the present disclosure relates to an energy supply apparatus. The energy supply apparatus individually supplies energy to a plurality of electrically-powered vehicles. The energy supply apparatus includes a control unit. The control unit is configured to hold a plurality of pieces of control software of the energy supply apparatus, associated with at least two of pieces of vehicle control software of each of the plurality of electrically-powered vehicles, and, when the energy is supplied to any one electrically-powered vehicle of the plurality of electrically-powered vehicles, select control software associated with vehicle control software of the any one electrically-powered vehicle from among the plurality of pieces of control software.

In the above configuration, the control unit may be configured to, when the control unit does not hold the control software associated with the vehicle control software of the any one electrically-powered vehicle, acquire and select the control software associated with the vehicle control software of the any one electrically-powered vehicle from a server capable of communicating with the energy supply apparatus.

Further another aspect of the present disclosure relates to an energy supply system. The energy supply system includes a plurality of supply apparatuses configured to supply energy, and an electrically-powered vehicle configured to supplement the energy independently from each of the plurality of supply apparatuses. The electrically-powered vehicle includes a controller. The controller is configured to hold a plurality of pieces of vehicle control software, associated with at least two of pieces of control software of each of the plurality of supply apparatuses, and, when the energy is supplemented from any one supply apparatus of the plurality of supply apparatuses, select vehicle control software associated with control software of the any one supply apparatus from among the plurality of pieces of vehicle control software.

In the above configuration, the energy supply system may further include a server capable of communicating with the electrically-powered vehicle. The controller may be configured to, when the controller does not hold the vehicle control software associated with the control software of the any one supply apparatus, acquire and select the vehicle control software associated with the control software of the any one supply apparatus from the server.

According to the aspects of the present disclosure, it is possible to avoid a situation in which two pieces of software that respectively control supply and supplement of energy do not support each other.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3A is an example of a vehicle control software management table of an electrically-powered vehicle;

FIG. 3B is an example of a first support table of the electrically-powered vehicle;

FIG. 3C is an example of a second support table of the electrically-powered vehicle;

FIG. 6 is an example of a vehicle control software management table of the vehicle management server;

FIG. 8 is an example of a control software management table of the station management server;

FIG. 10A is an example of a control software management table of the first charging station;

FIG. 10B is an example of a first support table of the first charging station;

FIG. 10C is an example of a second support table of the first charging station;

FIG. 11A is an example of a control software management table of the second charging station;

FIG. 11B is an example of a first support table of the second charging station;

FIG. 11C is an example of a second support table of the second charging station;

FIG. 15 is a process sequence diagram (part 2) showing an example of the operation of the energy supply system according to the second embodiment.

DETAILED DESCRIPTION OF EMBODIMENTS

Figure 1:
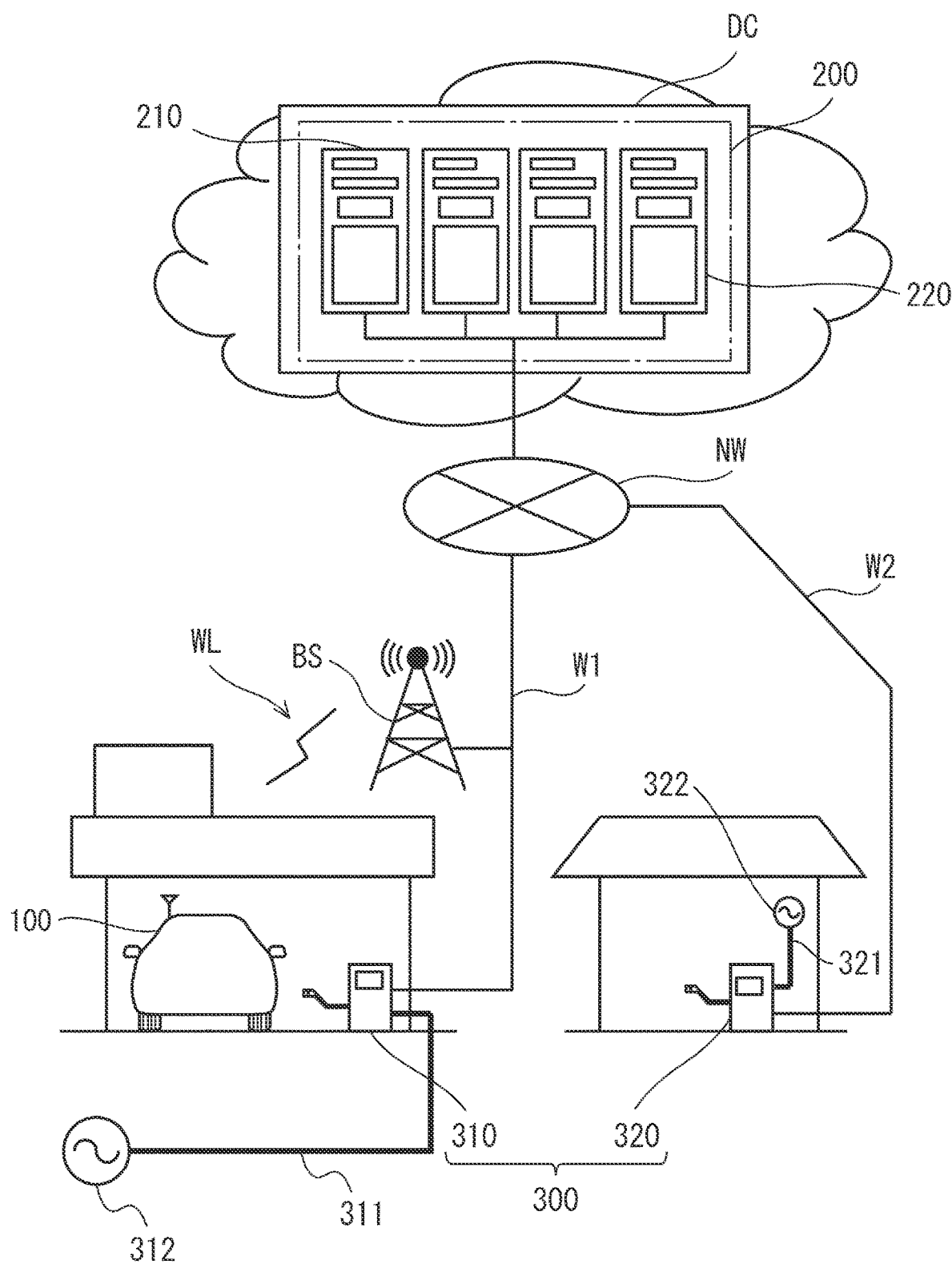
FIG. 1 is a diagram schematically showing the overall configuration of an energy supply system.

Hereinafter, embodiments of the present disclosure will be described with reference to the accompanying drawings.

First Embodiment

An energy supply system ST includes an electrically-powered vehicle 100, a management server group 200, and a plurality of charging stations 300. The electrically-powered vehicle 100 is not equipped with an engine and is equipped with an electrical storage device. The electrically-powered vehicle 100 is an electric vehicle capable of traveling with a motor by using electric power stored in the electrical storage device. The electrically-powered vehicle 100 also includes a plug-in electric vehicle (plug-in EV). The electrically-powered vehicle 100 may be a hybrid vehicle that is further equipped with an engine in addition to a motor or may be a fuel-cell vehicle that is equipped with a fuel cell that uses hydrogen as a fuel, instead of the electrical storage device or in addition to the electrical storage device. The electrically-powered vehicle 100 may be a privately-owned vehicle or may be a company-owned vehicle owned by a company.

The management server group 200 is installed in a data center DC that provides a cloud service. The management server group 200 includes various management servers such as a vehicle management server 210 and a station management server 220. The charging stations 300 include a first charging station 310 and a second charging station 320. Although not shown in the drawing, the charging stations 300 include a plurality of first charging stations and a plurality of second charging stations, in addition to the first charging station 310 and the second charging station 320. Each of the first charging station 310 and the second charging station 320 is an example of a supply apparatus and an energy supply apparatus.

The vehicle management server 210 and the station management server 220 are connected to each other by a wired communication network, such as a local area network (LAN). The vehicle management server 210 and the station management server 220 are connected to a communication network NW. The communication network NW is, for example, the Internet.

A cellular base station BS is connected to the communication network NW. When the electrically-powered vehicle 100 is included in a wireless communication area of the cellular base station BS, the cellular base station BS is able to communicate with the electrically-powered vehicle 100 via wireless communication WL. The cellular base station BS may also be regarded as being capable of communicating with the electrically-powered vehicle 100 by using over-the-air (OTA). Therefore, the electrically-powered vehicle 100 communicates with the vehicle management server 210 and the like via the communication network NW, the cellular base station BS, and the wireless communication WL. For example, a communication standard for wide-area wireless communication, such as Long Term Evolution (LTE), is used for the wireless communication W1.

The first charging station 310 and the second charging station 320 are connected to the communication network NW. The first charging station 310 is, for example, a quick charging station capable of supplying a direct-current power of several tens of kilowatts to several hundreds of kilowatts. The first charging station 310 is installed in, for example, a parking place of a public facility or commercial facility. The first charging station 310 is connected to a 200-volt three-phase alternating current power supply 312 via an electric power system 311 different from a communication system W1.

On the other hand, the second charging station 320 is, for example, a standard charging station capable of supplying a direct-current power of several kilowatts. The second charging station 320 is installed in a home garage of a person who owns the electrically-powered vehicle 100 or a parking place of a company that owns the electrically-powered vehicle 100. The second charging station 320 is connected to a 100-volt or 200-volt single-phase alternating current power supply 322 via an electric power system 321 different from a communication system W2.

The first charging station 310 and the second charging station 320 each supply electric power as energy to the electrically-powered vehicle 100 independently of each other. When, for example, the electrically-powered vehicle 100 is parked in a parking place where the first charging station 310 is installed, the first charging station 310 supplies electric power to the electrically-powered vehicle 100. Instead, when the electrically-powered vehicle 100 is parked in a garage where the second charging station 320 is installed, the second charging station 320 supplies electric power to the electrically-powered vehicle 100. The electrically-powered vehicle 100 is able to be charged with electric power supplied independently from each of the first charging station 310 and the second charging station 320.

The case where the electrically-powered vehicle 100 is charged with electric power supplied from the first charging station 310 will be specifically described. When electric power is supplied from the first charging station 310 to the electrically-powered vehicle 100, a first connector provided at the distal end of a charging cable extending from the first charging station 310 is connected to a first inlet of the electrically-powered vehicle 100. When an instruction to perform external charging is issued in the electrically-powered vehicle 100 or the first charging station 310, electric power is supplied from the first charging station 310 to the electrically-powered vehicle 100 through the charging cable. Thus, the electrically-powered vehicle 100 is able to supplement and charge electric power from the first charging station 310. The case where electric power is supplied from the second charging station 320 to the electrically-powered vehicle 100 is basically similar to the case of the first charging station 310, so the detailed description is omitted.

The vehicle management server 210 communicates with the electrically-powered vehicle 100 through the communication network NW, the cellular base station BS, and the wireless communication WL. The vehicle management server 210, for example, receives various pieces of information from the electrically-powered vehicle 100. The vehicle management server 210 transmits vehicle control software (specifically, a control program, firmware, or the like) for controlling the electrically-powered vehicle 100 to the electrically-powered vehicle 100. Vehicle control software includes supplement control software for controlling an operation related to supplement (that is, charging) of electric power.

The electrically-powered vehicle 100 receives the new-version vehicle control software via the wireless communication WL and updates the old-version vehicle control software with the new-version vehicle control software in a state where the old-version vehicle control software is not deleted and held. When the old-version vehicle control software is updated with the new-version vehicle control software, the function of the old-version vehicle control software is not exercised and is restricted. The, the function of the new-version vehicle control software is exercised. In this way, each time the electrically-powered vehicle 100 receives new-version vehicle control software, the electrically-powered vehicle 100 is in the latest state by holding the new-version vehicle control software while accumulating a plurality of different pieces of old-version vehicle control software.

On the other hand, the station management server 220 communicates with the first charging station 310 and the second charging station 320 through the communication network NW. The station management server 220 receives various pieces of information from the first charging station 310 and the second charging station 320. The station management server 220 transmits control software for controlling the first charging station 310 to the first charging station 310. Similarly, the station management server 220 transmits control software for controlling the second charging station 320 to the second charging station 320. The pieces of control software include supply control software for controlling operation related to supply of electric power.

Here, communication between the station management server 220 and the first charging station 310 will be described. The station management server 220 transmits new-version control software to the first charging station 310 in response to a regular request from the first charging station 310 based on, for example, a set date and time or the like. Thus, the first charging station 310 receives the new-version control software. As in the case of the electrically-powered vehicle 100, when the first charging station 310 receives new-version control software, the first charging station 310 updates old-version control software with the new-version control software in a state where the old-version control software is not deleted and is held. When the old-version control software is updated with the new-version control software, the function of the old-version control software is not exercised and is restricted. Then, the function of the new-version control software is exercised. In this way, each time the first charging station 310 receives new-version control software, the first charging station 310 is in the latest state by holding the new-version control software while accumulating a plurality of different pieces of old-version control software.

Next, communication between the station management server 220 and the second charging station 320 will be described. The station management server 220 transmits new-version control software to the second charging station 320 in response to an irregular request from the second charging station 320 as occasion arises. When, for example, a user who uses the second charging station 320 manually operates the second charging station 320 to issue an instruction to transmit new-version control software, the second charging station 320 makes a request of the station management server 220 for the new-version control software. When periodical transmission of control software requires a high communication fee, some users may set transmission based on manual operation to the second charging station 320 without setting dynamic periodical transmission.

When the second charging station 320 makes a request for transmission of the new-version control software, the station management server 220 transmits the new-version control software to the second charging station 320. Thus, the second charging station 320 receives the new-version control software. As in the case of the first charging station 310, each time the second charging station 320 receives new-version control software, the second charging station 320 is in the latest state by holding the new-version control software while accumulating a plurality of different pieces of old-version control software. In the case where, for example, the electrically-powered vehicle 100 is in the latest state, when the second charging station 320 is in the latest state, the second charging station 320 has compatibility with the electrically-powered vehicle 100 in the latest state, so the second charging station 320 is able to supply electric power to the electrically-powered vehicle 100. In other words, the electrically-powered vehicle 100 is able to supplement electric power from the second charging station 320. In other words, the electrically-powered vehicle 100 is able to be charged from the second charging station 320.

On the other hand, there is also a case where the second charging station 320 is not in the latest state due to forgetfulness, erroneous operation, or the like of a user. Although described in detail later, in this case, the electrically-powered vehicle 100 selects any one old-version vehicle control software having compatibility with the control software of the second charging station 320 from among a plurality of pieces of old-version vehicle control software to ensure compatibility with the second charging station 320 not in the latest state. Thus, even when the second charging station 320 is not in the latest state, the control software of the second charging station 320 has compatibility with the vehicle control software of the electrically-powered vehicle 100. Therefore, the second charging station 320 is able to supply electric power to the electrically-powered vehicle 100, and the electrically-powered vehicle 100 is able to supplement electric power from the second charging station 320.

Having compatibility means that there is a support relationship between pieces of software, and having no compatibility means that there is no support relationship between pieces of software. For compatibility related to charging, when there is a support relationship between the control software and the vehicle control software, output control and input control over electric power and communication normally operate. Thus, for example, the electrically-powered vehicle 100 is able to be charged at the fastest rate of charge. A charge completion time to completion of charging is able to be calculated with high accuracy. Other than the above, a screen guidance of the electrically-powered vehicle 100, the first charging station 310, or the second charging station 320, from which an instruction for external charging is issued, is able to be displayed normally. Therefore, when there is no support relationship between control software and vehicle control software, for example, the rate of charge may decrease, the accuracy of calculating a charging completion time may decrease, and the accuracy (for example, image quality or the like) of displaying a screen guidance may decrease.

Figure 2:
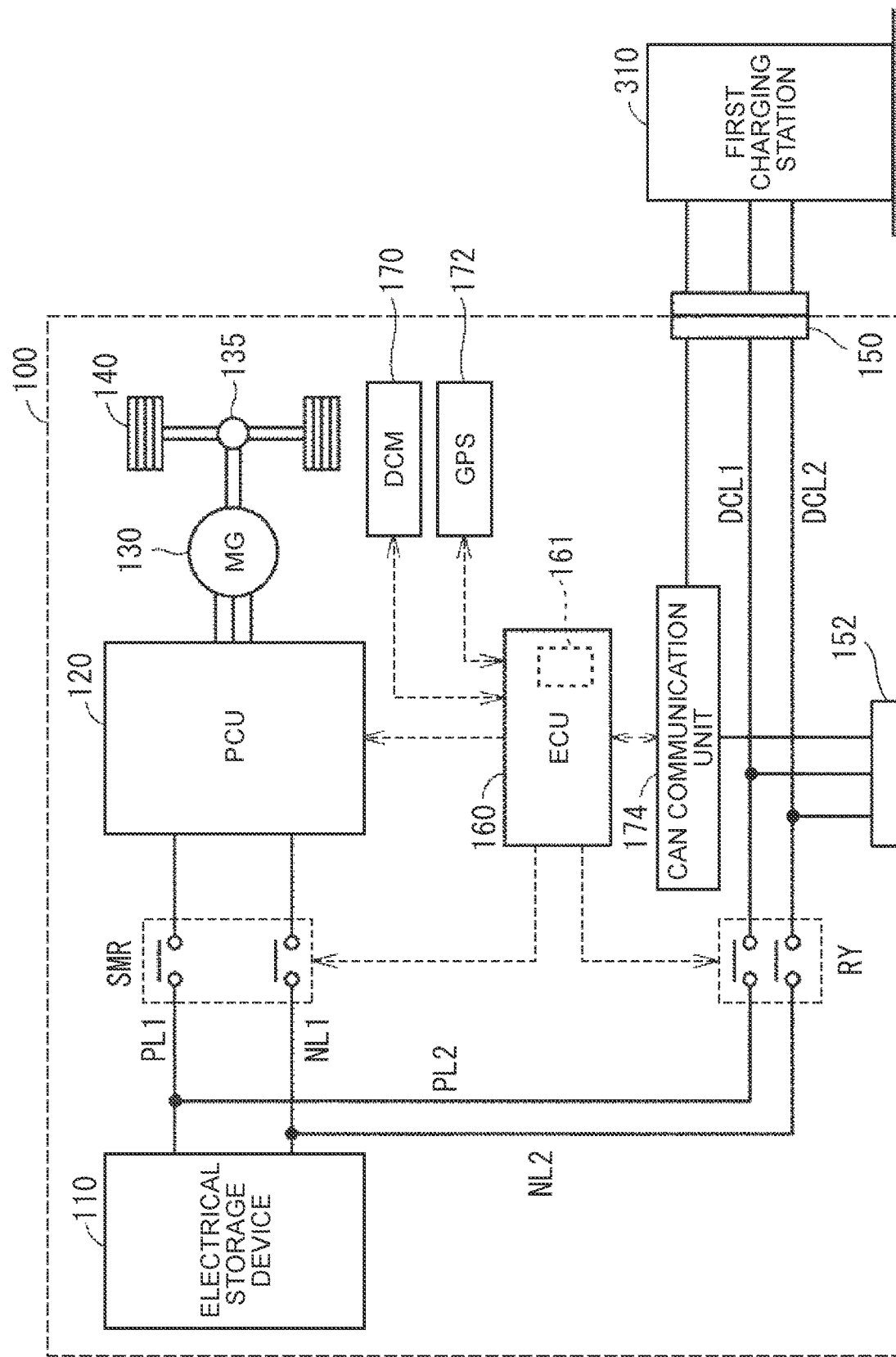
FIG. 2 is a diagram showing an example of the configuration of an electrically-powered vehicle.

The configuration of the electrically-powered vehicle 100 will be described with reference to FIG. 2. The electrically-powered vehicle 100 includes an electrical storage device 110, a system main relay SMR, and a power control unit (PCU) 120. The electrically-powered vehicle 100 includes a motor generator (MG) 130, a power transmission gear 135, drive wheels 140, a first inlet 150, a second inlet 152, and a charging relay RY. The electrically-powered vehicle 100 includes an electronic control unit (ECU) 160, a data communication module (DCM) 170, a global positioning system (GPS) receiver 172, and a controller area network (CAN) communication unit 174. The ECU 160 includes a central processing unit (CPU), a random access memory (RAM), a read only memory (ROM), an input and output interface (I/F), and a nonvolatile memory (NVM) 161.

The electrical storage device 110 is an electric power storage element configured to be chargeable and dischargeable. The electrical storage device 110 is, for example, a secondary battery, such as a lithium ion battery and a nickel-metal hydride battery, an electrical storage element, such as an electrical double-layer capacitor, or the like. A lithium ion battery is a secondary battery that uses lithium as a charge carrier. A lithium ion battery may be a lithium ion battery of which an electrolyte is liquid or may be an all-solid battery of which an electrolyte is solid.

The electrical storage device 110 is charged (externally charged) through a charging cable by the first charging station 310 located outside the vehicle and connected to the first inlet 150. The electrical storage device 110 may be charged (externally charged) through a charging cable by the second charging station 320 (see FIG. 1) located outside the vehicle and connected to the second inlet 152. The electrical storage device 110 supplies electric power to the MG 130 through the PCU 120 during traveling. The electrical storage device 110 is charged with electric power generated by the MG 130 through the PCU 120 during regenerative power generation of the MG 130 in vehicle braking.

The system main relay SMR is provided between the PCU 120 and a pair of power lines PL1, NL1 connected to the electrical storage device 110. The system main relay SMR is turned on by the ECU 160 when a vehicle system is started up by a start switch (not shown), or the like.

The PCU 120 is a drive unit that drives the MG 130 and is made up of power conversion devices such as a converter and an inverter. The PCU 120 is controlled by the ECU 160 and converts direct-current power supplied from the electrical storage device 110 to alternating-current power for driving the MG 130. The PCU 120 converts alternating-current power generated by the MG 130 to direct-current power and outputs the direct-current power to the electrical storage device 110.

The MG 130 is an alternating-current rotating electrical machine and is, for example, a three-phase alternating-current synchronous motor in which permanent magnets are embedded in a rotor. The MG 130 is driven by the PCU 120 to generate rotational driving force, and the driving force generated by the MG 130 is transmitted to the drive wheels 140 through the power transmission gear 135. On the other hand, for example, during braking of the vehicle, the MG 130 operates as a generator and performs regenerative power generation. The electric power generated by the MG 130 is supplied to the electrical storage device 110 through the PCU 120.

The charging relay RY is provided between a pair of power lines DCL1, DCL2 connected to the first inlet 150 and the second inlet 152 and a pair of power lines PL2, NL2 connected to the pair of power lines PL1, NL1. The charging relay RY is turned on by the ECU 160 at the time of performing external charging.

The first inlet 150 receives electric power supplied from the first charging station 310 during external charging. During external charging, the first connector of the first charging station 310 is connected to the first inlet 150, and direct-current power output from the first charging station 310 is supplied to the electrical storage device 110 through the first inlet 150, the pair of power lines DCL1, DCL2, the charging relay RY, the pair of power lines PL2, NL2, and the pair of power lines PL1, NL1.

The second inlet 152 receives electric power supplied from the second charging station 320 (see FIG. 1) during external charging. During external charging, the second connector of the second charging station 320 is connected to the second inlet 152, and direct-current power output from the second charging station 320 is supplied to the electrical storage device 110 through the second inlet 152, the pair of power lines DCL1, DCL2, the charging relay RY, the pair of power lines PL2, NL2, and the pair of power lines PL1, NL1.

The DCM 170 is an onboard communication instrument for communicating with the vehicle management server 210 (see FIG. 1). The DCM 170 is capable of bidirectional communication between the electrically-powered vehicle 100 (specifically, the ECU 160) and the vehicle management server 210 through the wireless communication WL, the cellular base station BS, and the communication network NW. The GPS receiver 172 determines a current location based on radio waves from artificial satellites and outputs the determined location information to the ECU 160. Location information determined by the GPS receiver 172 is used in, for example, a navigation system (not shown) or the like.

The navigation system includes map information. The map information includes location information on various facilities in which the first charging stations 310 are installed and location information on a place where the second charging station 320 is installed. Therefore, the electrically-powered vehicle 100 is able to identify the model IDs of the plurality of charging stations 300 based on location information on the current location of the electrically-powered vehicle 100 and location information on facilities and the like. For example, when the first charging station 310 is included in a close-in range of the electrically-powered vehicle 100, the model ID indicating a quick charger is able to be identified. When the second charging station 320 is included in a close-in range of the electrically-powered vehicle 100, the model ID indicating a standard charger is able to be identified.

The CAN communication unit 174 performs CAN communication between the electrically-powered vehicle 100 (specifically, the ECU 160) and the first charging station 310 or the second charging station 320 during external charging. In the present embodiment, an example in which DC charging is performed in accordance with CHAdeMO (registered trademark) mode is described, and communication between the electrically-powered vehicle 100 and the first charging station 310 is also performed in accordance with a CAN communication protocol employed in CHAdeMO.

A charge mode that can be employed in the electrically-powered vehicle 100 according to the present embodiment is not limited to the CHAdeMO mode, and, for example, a combined charging system (combo) mode for which standardization is being pursued mainly in Europe and the United States of America may also be employed. Communication between the electrically-powered vehicle 100 and the first charging station 310 or the second charging station 320 is also not limited to CAN communication employed in the CHAdeMO mode and may be performed by power line communication (PLC) or near field communication.

When the electrically-powered vehicle 100 is traveling, the ECU 160 controls drive of the MG 130 and charge and discharge of the electrical storage device 110 by turning on the system main relay SMR and controlling the PCU 120. During external charging, the ECU 160 performs external charging by turning on the charging relay RY and transmitting a charging start request, a charging current command value, and the like to the first charging station 310 or the second charging station 320 through the CAN communication unit 174. The ECU 160 calculates the state of charge (SOC) of the electrical storage device 110. When the SOC reaches a predetermined upper limit value, the ECU 160 transmits a charging stop request to the first charging station 310 or the second charging station 320 through the CAN communication unit 174 and turns off the charging relay RY.

As for a method of calculating the SOC, known various methods, such as a method using an open circuit voltage (OCV)-SOC curve (map or the like) representing the relationship between OCV and SOC, a method using an integrated value of charging and discharging current, and Residual capacity/Full charge capacity×100, may be used.

The charging cable of the first charging station 310 has the first connector connectable to the first inlet 150 of the electrically-powered vehicle 100. In a state where the first connector is connected to the first inlet 150, direct-current power can be supplied from the first charging station 310 to the electrically-powered vehicle 100, and CAN communication can be performed between the first charging station 310 and the electrically-powered vehicle 100. The second charging station 320 is basically similar to the first charging station 310, so the detailed description is omitted.

In a state where the first connector of the first charging station 310 is connected to the first inlet 150, data to be transmitted from the electrically-powered vehicle 100 to the first charging station 310 includes various charging data, for example, a charging start request, a charging stop request, a charging current command value, and a charging voltage upper limit. On the other hand, data to be transmitted from the first charging station 310 to the electrically-powered vehicle 100 includes various output data, for example, maximum output information (such as available current value and available voltage value) and current output information (such as a current output current value and a current output voltage value). The second charging station 320 is basically similar to the first charging station 310.

The details of the NVM 161 will be described with reference to FIG. 3A to FIG. 3C. Initially, the NVM 161 stores vehicle control software in a vehicle control software management table of the electrically-powered vehicle 100. Specifically, as shown in FIG. 3A, the NVM 161 stores vehicle model ID, vehicle control software, version, date of release, and the like in association with one another. A vehicle model ID is an identifier for identifying the model of the electrically-powered vehicle 100. Examples of the model of the electrically-powered vehicle 100 include a plug-in EV and a hybrid vehicle. A version and a date of release are respectively the version and available date of vehicle control software. In the first embodiment, version "V1" and version "V2" each correspond to the old version of vehicle control software in the electrically-powered vehicle 100, and version "V3" corresponds to the new version of vehicle control software in the electrically-powered vehicle 100.

The NVM 161 stores compatibility data on compatibility between the electrically-powered vehicle 100 and each of the first charging station 310 and the second charging station 320. Specifically, as shown in FIG. 3B and FIG. 3C, the NVM 161 manages compatibility data by using a first support table and a plurality of second support tables of the electrically-powered vehicle 100. These compatibility data are stored in the NVM 161 in advance, for example, before the NVM 161 stores vehicle control software.

As shown in FIG. 3B, the first support table manages a plurality of combinations of station model ID and vehicle model ID as compatibility data. A station model ID is an identifier for identifying the model of the charging station 300. In the first embodiment, station model ID "S1" is assigned to the first charging station 310, and station model ID "S2" is assigned to the second charging station 320. Station model ID "S1" corresponds to a quick charger, and station model ID "S2" corresponds to a standard charger. A combination of station model ID and vehicle model ID is uniquely identified by using the first support table.

As shown in FIG. 3C, the second support tables each manage compatibility between the version of control software of the first charging station 310 or the second charging station 320 to which a station model ID is assigned and the version of vehicle control software of the electrically-powered vehicle 100 to which a vehicle model ID is assigned as compatibility data for each combination of station model ID and vehicle model ID. Compatibility "YES" indicates that there is compatibility between control software and vehicle control software. Compatibility "NO" indicates that there is no compatibility between control software and vehicle control software. Therefore, in FIG. 3C, it indicates that there is no compatibility between version "V2" of control software of the second charging station 320 to which station model ID "S2" is assigned and version "V1" and version "V3" of vehicle control software of the electrically-powered vehicle 100 to which vehicle model ID "E1" is assigned. With the second support tables, it is possible to uniquely identify compatibility between a version of control software and a version of vehicle control software.

Figure 4:
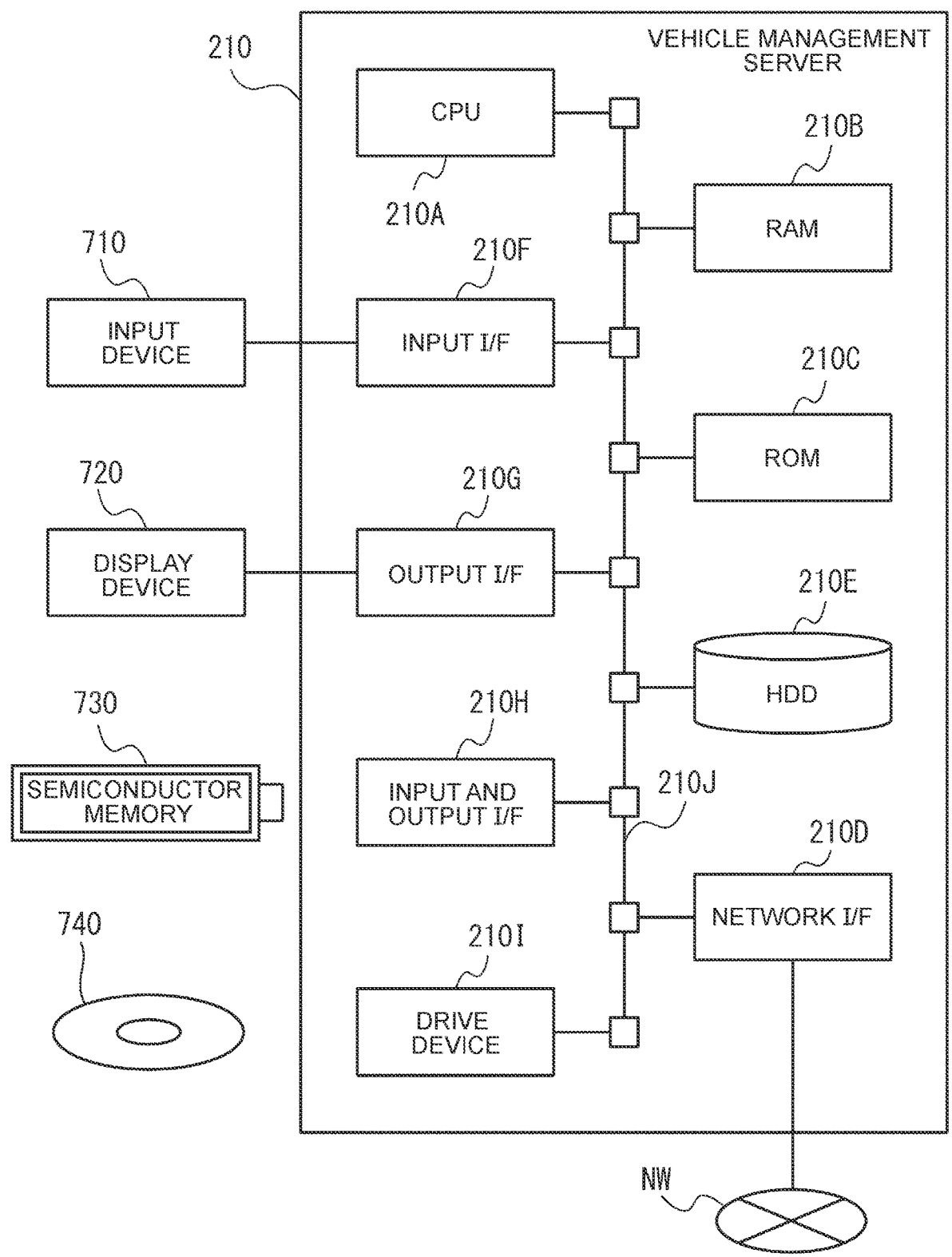
FIG. 4 is an example of the hardware configuration of a vehicle management server.

The hardware configuration of the vehicle management server 210 will be described with reference to FIG. 4. The station management server 220 basically has a similar hardware configuration to that of the vehicle management server 210, so the description thereof is omitted. As shown in FIG. 4, the vehicle management server 210 includes a CPU 210A serving as a processor, a RAM 210B and a ROM 210C serving as a memory, and a network I/F 210D. The vehicle management server 210, where necessary, may include at least one of a hard disk drive (HDD) 210E, an input I/F 210F, an output I/F 210G, an input and output I/F 210H, and a drive device 210I. The CPU 210A, the RAM 210B, the ROM 210C, the network I/F 210D, the HDD 210E, the input I/F 210F, the output I/F 210G, the input and output I/F 210H, and the drive device 210I are connected to one another by an internal bus 210J.

An input device 710 is connected to the input I/F 210F. A keyboard or a mouse (not shown) is an example of the input device 710. A display device 720 is connected to the output I/F 210G. A liquid crystal display is an example of the display device 720. A semiconductor memory 730 is connected to the input and output I/F 210H. For example, a universal serial bus (USB) drive, a flash memory, or the like is an example of the semiconductor memory 730. The input and output I/F 210H reads out a program or data stored in the semiconductor memory 730. The input I/F 210F and the input and output I/F 210H each include, for example, a USB port. The output I/F 210G includes, for example, a display port.

A portable recording medium 740 is inserted in the drive device 210I. For example, a removable disc, such as a compact disc (CD)-ROM and a digital versatile disc (DVD), is an example of the portable recording medium 740. The drive device 210I reads out a program or data stored in the portable recording medium 740. The network I/F 210D includes, for example, a LAN port. The network I/F 210D is connected to the communication network NW.

The program stored in the ROM 210C or the HDD 210E is temporarily stored in the RAM 210B by the CPU 210A. The program recorded on the portable recording medium 740 is temporarily stored in the RAM 210B by the CPU 210A. When the CPU 210A runs the stored program, the CPU 210A implements various functions (described later) and executes various processes (described later). A program just needs to be in accordance with a process sequence diagram (described later).

Figure 5:
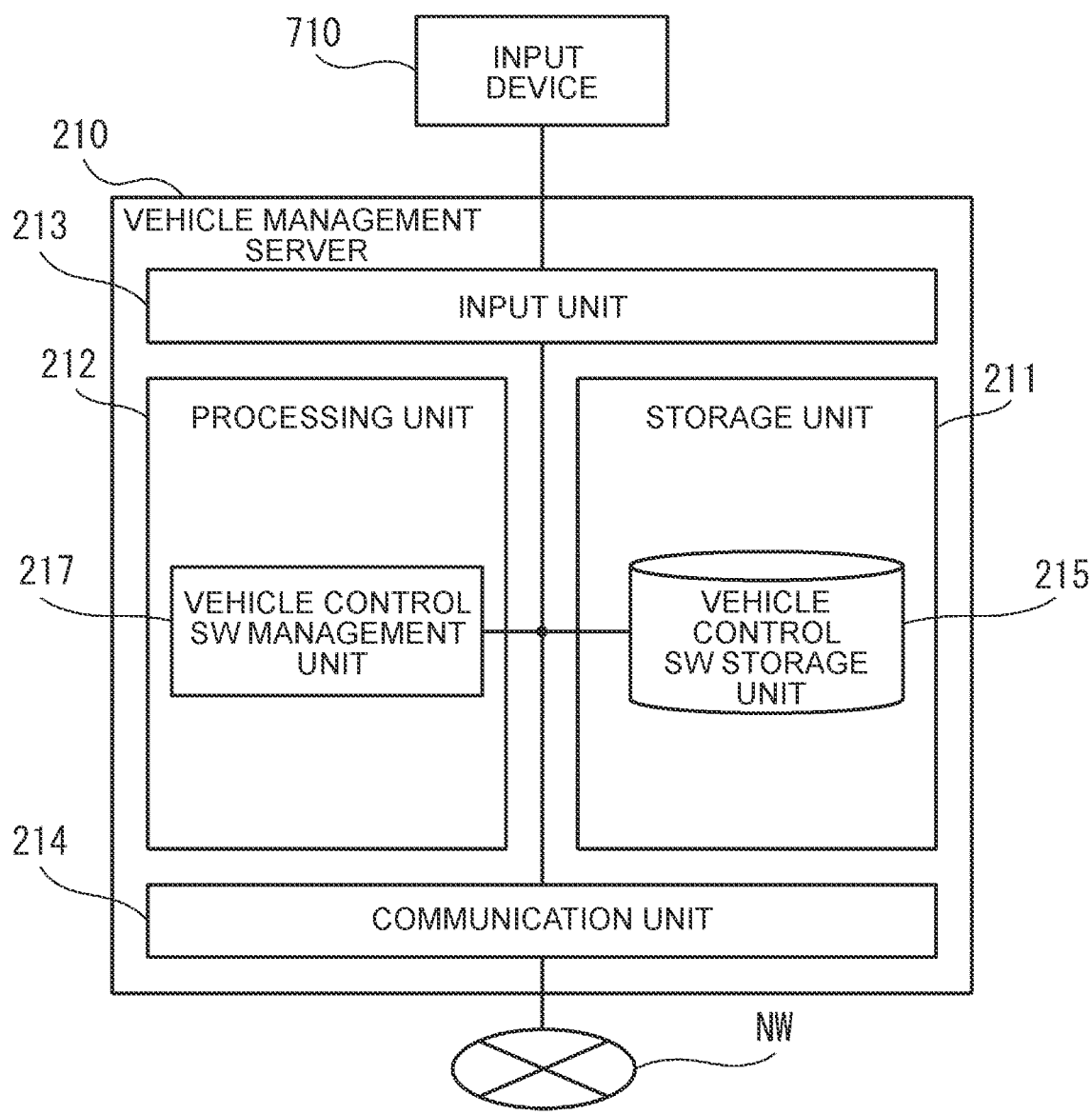
FIG. 5 is an example of the functional configuration of the vehicle management server.

The functional configuration of the vehicle management server 210 will be described with reference to FIG. 5 and FIG. 6. FIG. 5 shows a main part of the functions of the vehicle management server 210.

As shown in FIG. 5, the vehicle management server 210 includes a storage unit 211, a processing unit 212, an input unit 213, and a communication unit 214. The storage unit 211 is implemented by the RAM 210B, the HDD 210E, or the like. The processing unit 212 is implemented by the CPU 210A. The input unit 213 is implemented by the input I/F 210F. The communication unit 214 is implemented by the network I/F 210D. Therefore, the storage unit 211, the processing unit 212, the input unit 213, and the communication unit 214 are connected to one another.

The storage unit 211 includes a vehicle control software (hereinafter, referred to as SW) storage unit 215. The vehicle control SW storage unit 215 may be provided in another management server different from the vehicle management server 210. In this case, the vehicle management server 210 may access another management server and reference details stored in the vehicle control SW storage unit 215.

The vehicle control SW storage unit 215 stores vehicle control software in a vehicle control software management table of the vehicle management server 210. Specifically, as shown in FIG. 6, the vehicle control SW storage unit 215 stores vehicle model ID, vehicle control software, version, date of release, and the like in association with one another. Different from the vehicle control software management table of the electrically-powered vehicle 100, the vehicle control SW storage unit 215 stores version "V4" of vehicle control software "E1 control program" as the new version of vehicle control software. In this way, depending on the timing of transmitting vehicle control software to the electrically-powered vehicle 100 by the vehicle management server 210, the vehicle control software management table of the electrically-powered vehicle 100 may differ from the vehicle control software management table of the vehicle management server 210.

The processing unit 212 includes the vehicle control SW management unit 217. The vehicle control SW management unit 217 accesses the vehicle control SW storage unit 215 and executes various processes. For example, when a plurality of pieces of vehicle control software is requested from the electrically-powered vehicle 100, the vehicle control SW management unit 217 transmits a plurality of pieces of vehicle control software to the electrically-powered vehicle 100. The details of the vehicle control SW management unit 217 will be described when the operation of the energy supply system ST is described.

Figure 7:
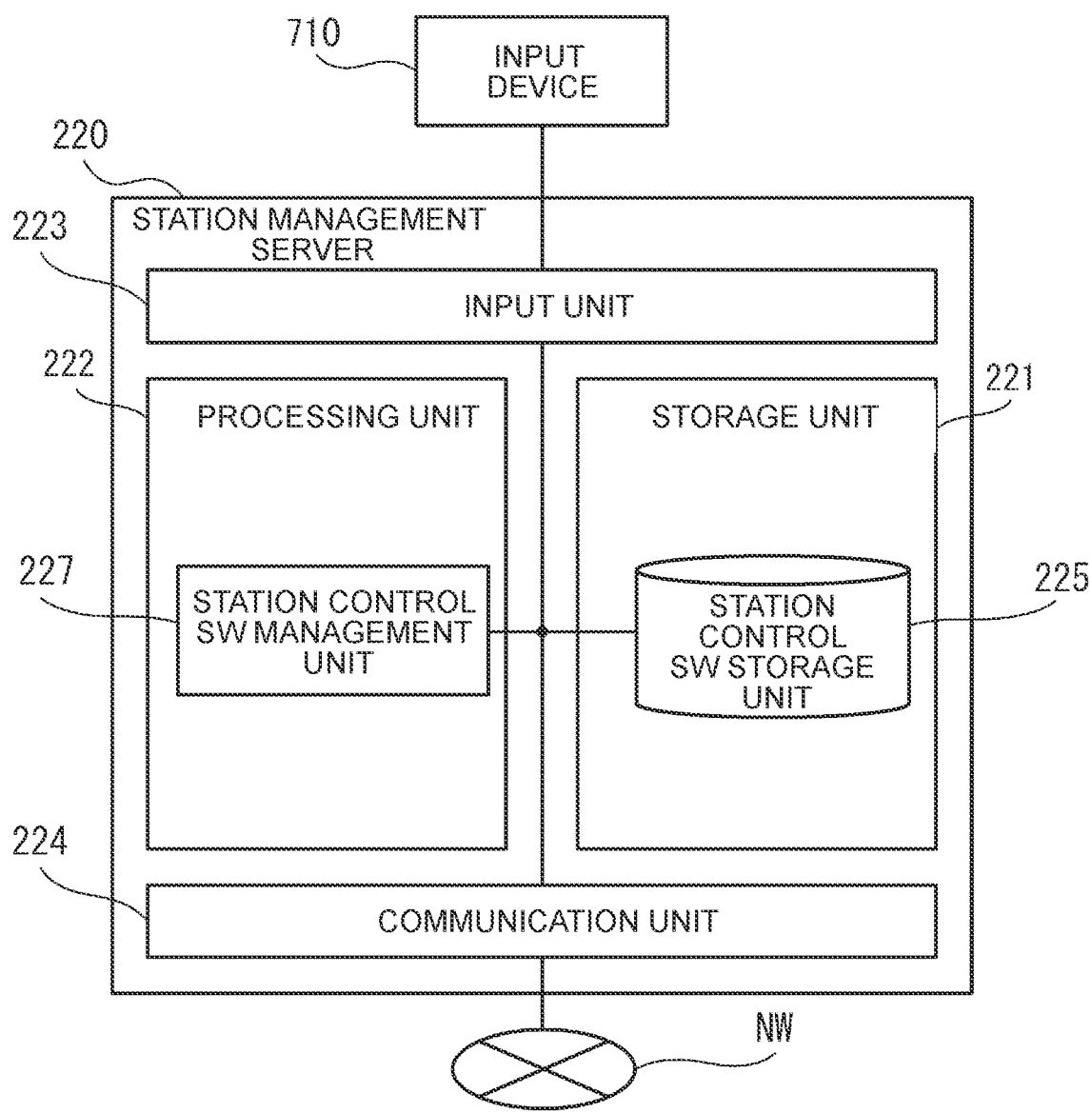
FIG. 7 is an example of the functional configuration of a station management server.

The functional configuration of the station management server 220 will be described with reference to FIG. 7 and FIG. 8. FIG. 7 shows a main part of the functions of the station management server 220.

As shown in FIG. 7, the station management server 220 includes a storage unit 221, a processing unit 222, an input unit 223, and a communication unit 224. The storage unit 221 is implemented by the RAM 210B, the HDD 210E, or the like. The processing unit 222 is implemented by the CPU 210A. The input unit 223 is implemented by the input I/F 210F. The communication unit 224 is implemented by the network I/F 210D. Therefore, the storage unit 221, the processing unit 222, the input unit 223, and the communication unit 224 are connected to one another.

The storage unit 221 includes a station control SW storage unit 225. The station control SW storage unit 225 may be provided in another management server different from the station management server 220. In this case, the station management server 220 may access another management server and reference details stored in the station control SW storage unit 225.

The station control SW storage unit 225 stores control software for controlling the charging station 300 in a control software management table of the station management server 220. Specifically, as shown in FIG. 8, the station control SW storage unit 225 stores station model ID, control software, version, date of release, and the like in association with one another. As in the case of vehicle control software, version "V1", version "V2", and version "V3" each correspond to the old version of control software, and version "V4" corresponds to the new version of control software.

The processing unit 222 includes a station control SW management unit 227. The station control SW management unit 227 accesses the station control SW storage unit 225 and executes various processes. For example, when the station control SW management unit 227 is requested for a plurality of pieces of control software from the first charging station 310, the station control SW management unit 227 transmits a plurality of pieces of control software associated with the station model ID of the first charging station 310 to the first charging station 310. When the station control SW management unit 227 is requested for a plurality of pieces of control software from the second charging station 320, the station control SW management unit 227 transmits a plurality of pieces of control software associated with the station model ID of the second charging station 320 to the second charging station 320. The details of the station control SW management unit 227 will be described when the operation of the energy supply system ST is described.

Figure 9A:
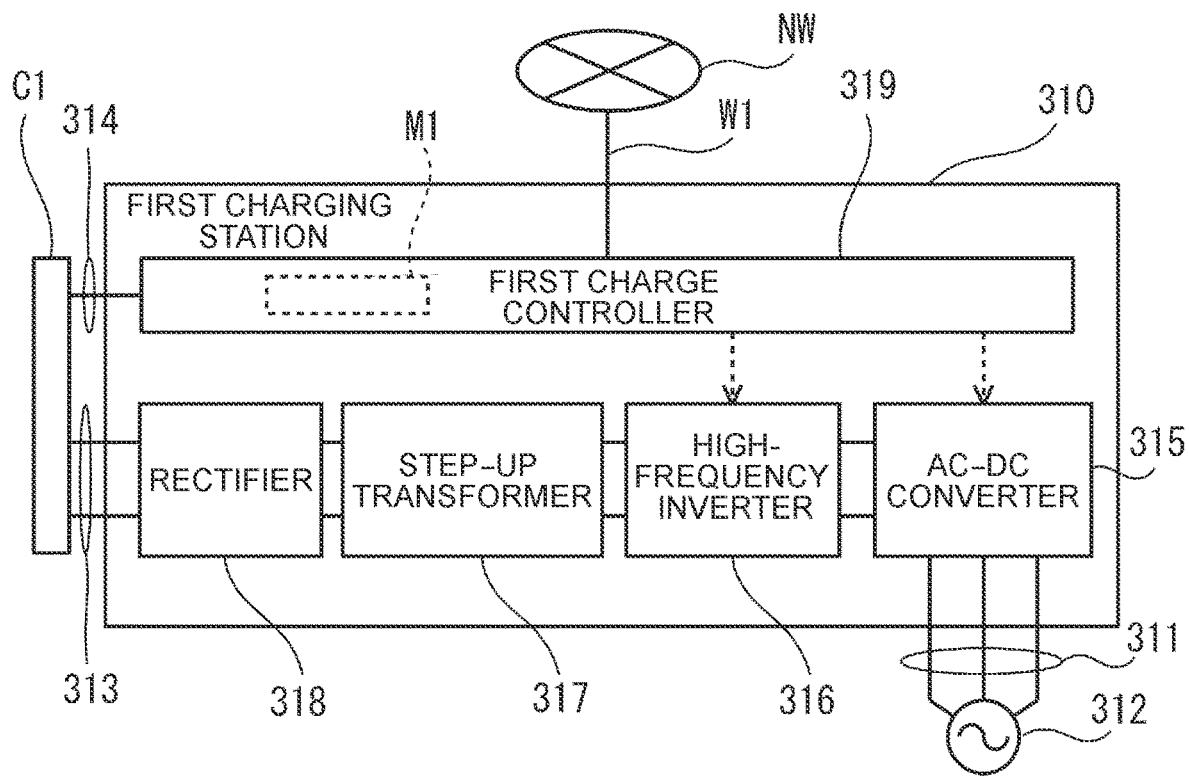
FIG. 9A is an example of the configuration of a first charging station.

The configuration of the first charging station 310 will be described with reference to FIG. 9A. The first charging station 310 includes an AC-DC converter 315, a high-frequency inverter 316, a step-up transformer 317, a rectifier 318, and a first charge controller 319. The first charge controller 319 includes a CPU, a RAM, a ROM, an input and output I/F, and an NVM 319m. A three-phase alternating current power supply 312 is connected to the AC-DC converter 315 via an electric power system 311. One end of a pair of first power lines 313 is connected to the rectifier 318. One end of a first communication line 314 is connected to the first charge controller 319. A first connector C1 is connected to the other end of the pair of first power lines 313 and the other end of the first communication line 314. The first connector C1 is able to connect with the first inlet 150 of the electrically-powered vehicle 100. The pair of first power lines 313 and the first communication line 314 are part of a charging cable extending from the first charging station 310 and included in the charging cable.

The AC-DC converter 315 receives electric power supplied from the three-phase alternating current power supply 312 and converts alternating-current power to direct-current power. The high-frequency inverter 316 converts direct-current power to high-frequency (rectangular wave) alternating-current power to enhance step-up efficiency. The step-up transformer 317 steps up high-frequency alternating-current power. The rectifier 318 rectifies and smooths stepped-up alternating-current power stepped up from high-frequency alternating-current power and outputs direct-current power via the first connector C1. The first charge controller 319 controls the operations of the AC-DC converter 315 and high-frequency inverter 316 while exchanging information such as the current SOC of the electrical storage device 110 with the ECU 160 (see FIG. 2) of the electrically-powered vehicle 100.

Figure 9B:
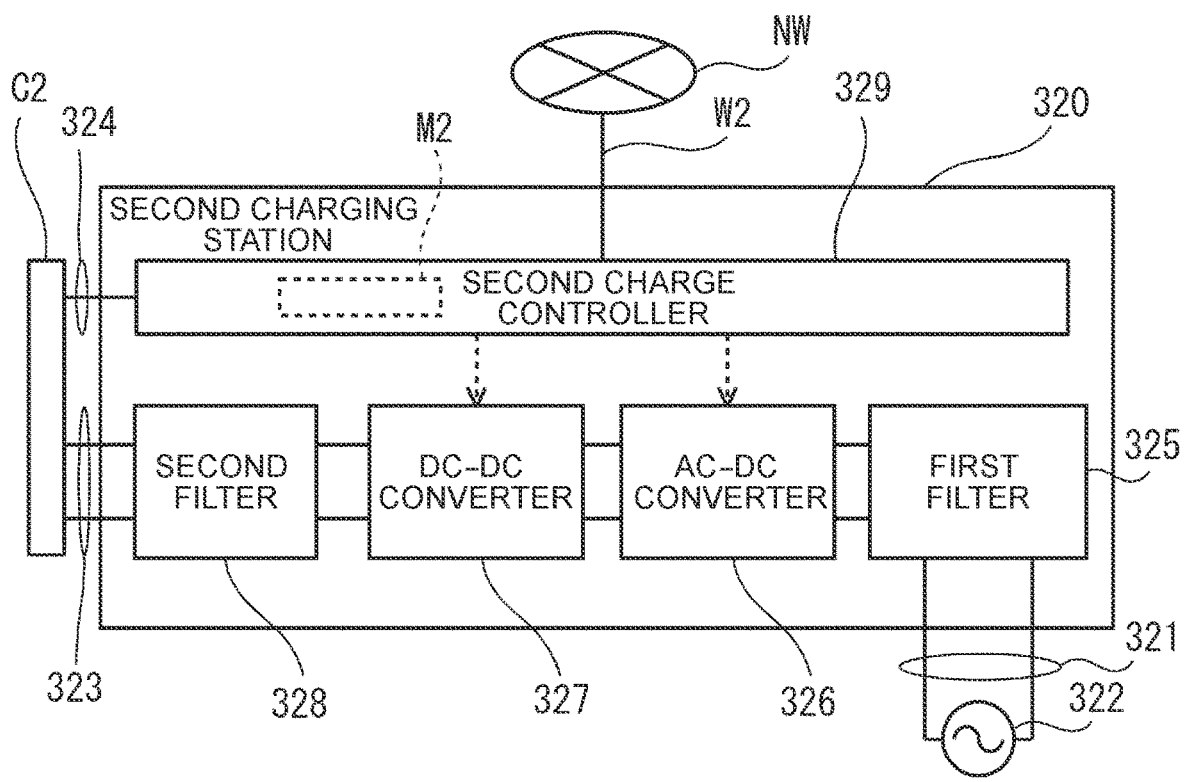
FIG. 9B is an example of the configuration of a second charging station.

The configuration of the second charging station 320 will be described with reference to FIG. 9B. The second charging station 320 includes a first filter 325, an AC-DC converter 326, a DC-DC converter 327, a second filter 328, and a second charge controller 329. The second charge controller 329 includes a CPU, a RAM, a ROM, an input and output I/F, and an NVM 329m. A single-phase alternating current power supply 322 is connected to the first filter 325 via an electric power system 321. One end of a pair of second power lines 323 is connected to the second filter 328. One end of a second communication line 324 is connected to the second charge controller 329. A second connector C2 is connected to the other end of the pair of second power lines 323 and the other end of the second communication line 324. The second connector C2 is able to connect with the second inlet 152 of the electrically-powered vehicle 100. The pair of second power lines 323 and the second communication line 324 are part of a charging cable extending from the second charging station 320 and included in the charging cable.

The first filter 325 suppresses the inflow of noise from the single-phase alternating current power supply 322 and the outflow of noise to the single-phase alternating current power supply 322 while receiving electric power supplied from the single-phase alternating current power supply 322. The AC-DC converter 326 converts alternating-current power received by the first filter 325 to direct-current power. The DC-DC converter 327 converts direct-current power output from the AC-DC converter 326 to direct-current power having a different voltage. The second filter 328 smooths direct-current power and outputs the direct-current power via the second connector C2. The second charge controller 329 controls the operations of the AC-DC converter 326 and DC-DC converter 327 while exchanging information such as the current SOC of the electrical storage device 110 with the ECU 160 (see FIG. 2) of the electrically-powered vehicle 100.

The details of the NVM 319m included in the first charge controller 319 will be described with reference to FIG. 10A to FIG. 10C. Initially, the NVM 319m stores control software in the control software management table of the first charging station 310. Specifically, as shown in FIG. 10A, the NVM 319m stores station model ID, control software, version, date of release, and the like in association with one another.

The NVM 319m stores compatibility data on compatibility between the electrically-powered vehicle 100 and the first charging station 310. Specifically, as shown in FIG. 10B and FIG. 10C, the NVM 319m manages compatibility data by using a first support table and a plurality of second support tables of the first charging station 310. These compatibility data are stored in the NVM 319m in advance, for example, before the NVM 319m stores control software.

As shown in FIG. 10B, the first support table manages a plurality of combinations of station model ID and vehicle model ID as compatibility data. A combination of station model ID and vehicle model ID is uniquely identified by using the first support table. As shown in FIG. 10C, the second support tables each manage compatibility between the version of control software of the first charging station 310 to which a station model ID is assigned and the version of vehicle control software of the electrically-powered vehicle 100 to which a vehicle model ID is assigned as compatibility data for each combination of station model ID and vehicle model ID. With the second support tables, it is possible to uniquely identify compatibility between a version of control software and a version of vehicle control software.

The details of the NVM 329m included in the second charge controller 329 will be described with reference to FIG. 11A to FIG. 11C. Initially, the NVM 329m stores control software in the control software management table of the second charging station 320. Specifically, as shown in FIG. 11A, the NVM 329m stores station model ID, control software, version, date of release, and the like in association with one another.

The NVM 329m stores compatibility data on compatibility between the electrically-powered vehicle 100 and the second charging station 320. Specifically, as shown in FIG. 11B and FIG. 11C, the NVM 329m manages compatibility data by using a first support table and a plurality of second support tables of the second charging station 320. These compatibility data are stored in the NVM 329m in advance, for example, before the NVM 329m stores control software.

As shown in FIG. 11B, the first support table manages a plurality of combinations of station model ID and vehicle model ID as compatibility data. A combination of station model ID and vehicle model ID is uniquely identified by using the first support table. As shown in FIG. 11C, the second support tables each manage compatibility between the version of control software of the second charging station 320 to which a station model ID is assigned and the version of vehicle control software of the electrically-powered vehicle 100 to which a vehicle model ID is assigned as compatibility data for each combination of station model ID and vehicle model ID. With the second support tables, it is possible to uniquely identify compatibility between a version of control software and a version of vehicle control software.

Figure 12:
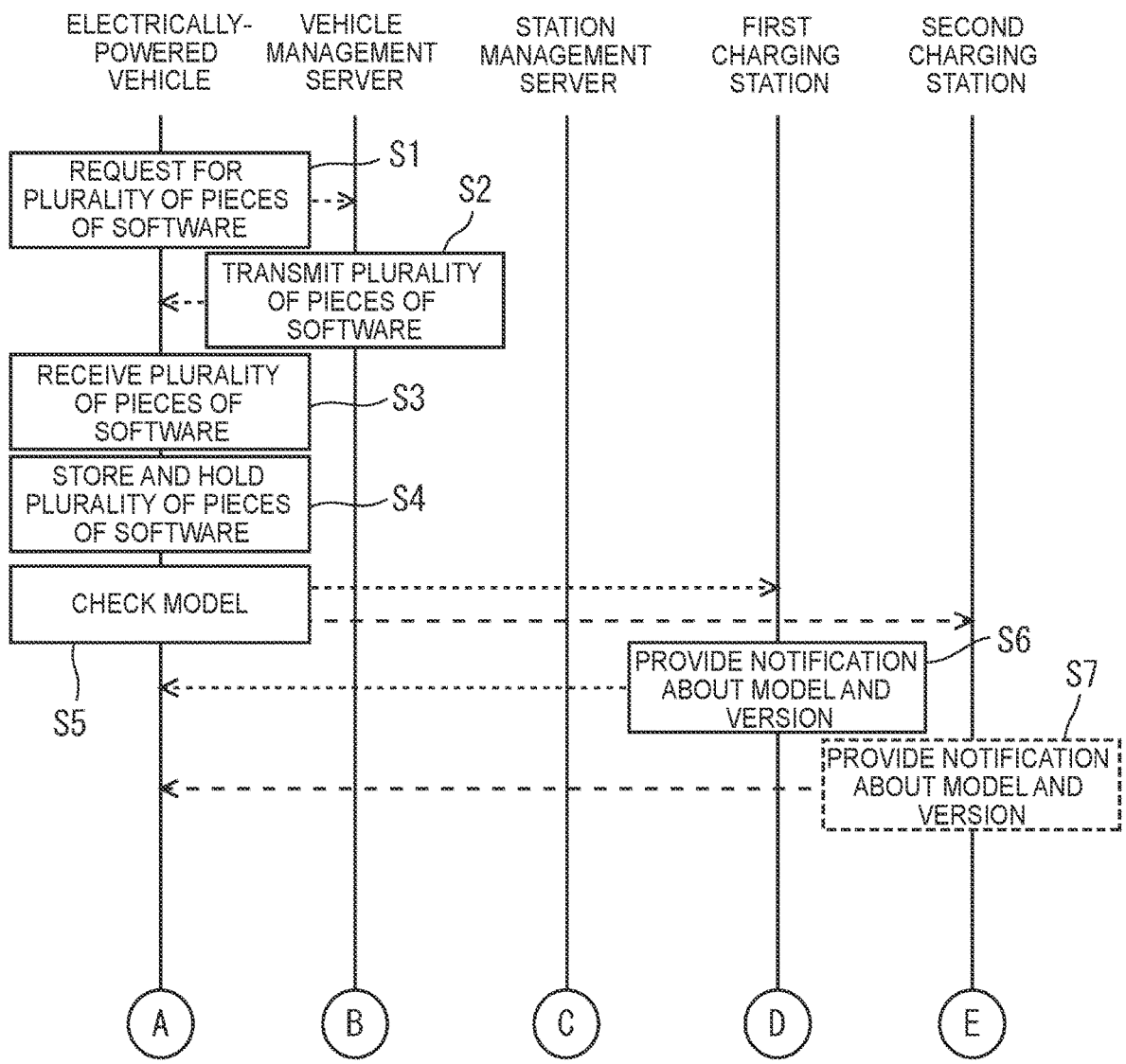
FIG. 12 is a process sequence diagram (part 1) showing an example of the operation of the energy supply system according to a first embodiment.
Figure 13:
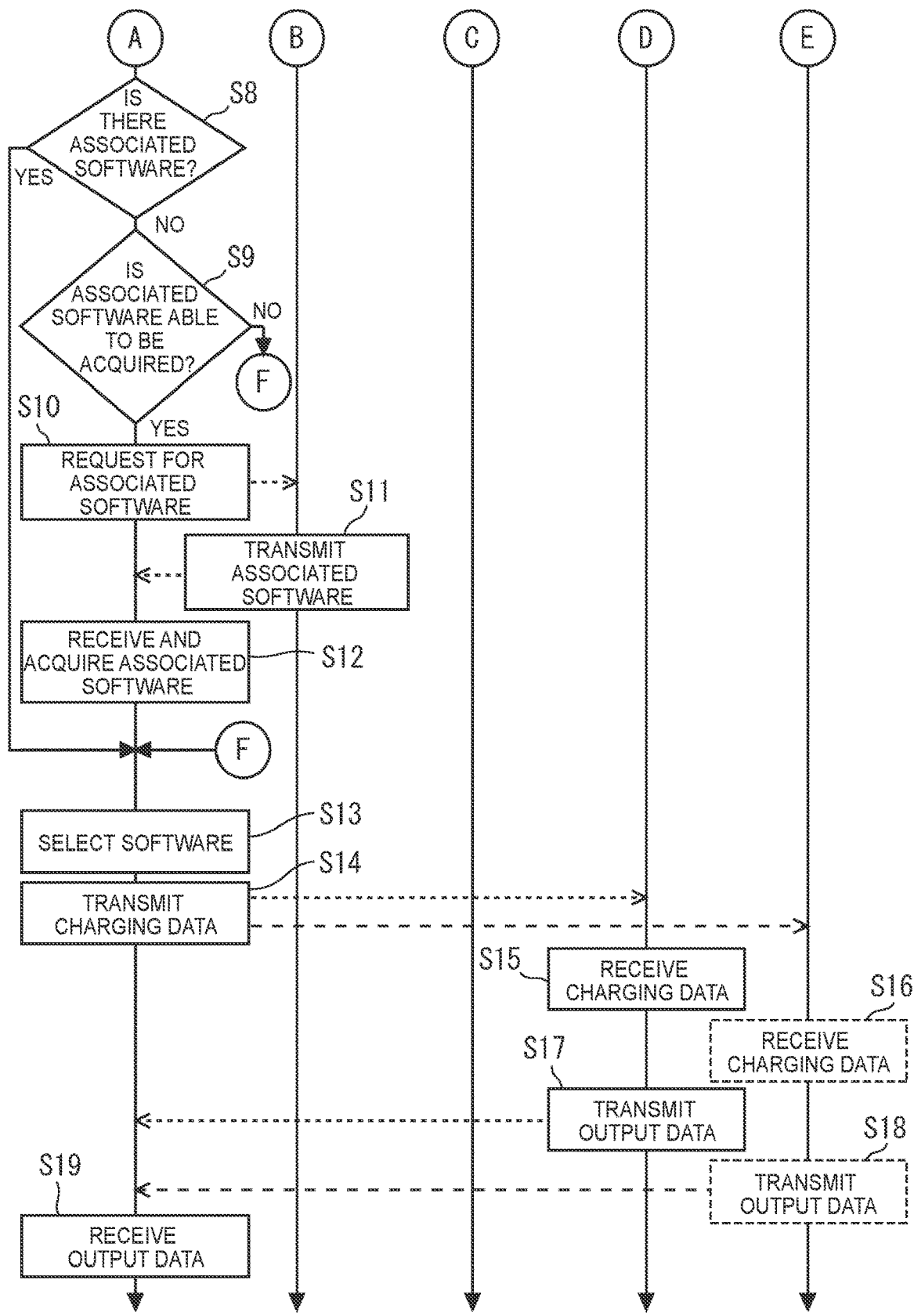
FIG. 13 is a process sequence diagram (part 2) showing an example of the operation of the energy supply system according to the first embodiment.

The operation of the energy supply system ST according to the first embodiment will be described with reference to FIG. 12 and FIG. 13. In FIG. 12 and FIG. 13, a continuation of process is represented by the character "A", the character "B", or the like.

Initially, as shown in FIG. 12, the ECU 160 of the electrically-powered vehicle 100 makes a request of the vehicle management server 210 for a plurality of pieces of vehicle control software (step S1). The ECU 160 does not need to make a request for a plurality of pieces of vehicle control software in a collective manner and may make a request for each of a plurality of pieces of vehicle control software individually. For example, the ECU 160 makes a request for a plurality of pieces of vehicle control software by transmitting information including a vehicle model ID assigned to the ECU 160 itself or the DCM 170 and a date of release to the vehicle management server 210 as a first transmission target condition. In the present embodiment, the ECU 160 transmits information including vehicle model ID "E1" and a date of release "Jan. 8, 2020" to a date of release "Nov. 8, 2020" as a first transmission target condition.

When the vehicle control SW management unit 217 of the vehicle management server 210 is requested for a plurality of pieces of vehicle control software, the vehicle control SW management unit 217 transmits a plurality of pieces of vehicle control software to the electrically-powered vehicle 100 (step S2). When the above-described first transmission target condition is transmitted, the vehicle control SW management unit 217 accesses the vehicle control SW storage unit 215 and extracts vehicle control software that satisfies the first transmission target condition from the vehicle control software management table (see FIG. 6) of the vehicle management server 210. In the present embodiment, the vehicle control SW management unit 217 extracts vehicle control software of version "V1", version "V2", and version "V3" of vehicle model ID "E1". The vehicle control SW management unit 217 transmits the extracted vehicle control software to the electrically-powered vehicle 100.

When a plurality of pieces of vehicle control software is transmitted, the ECU 160 receives the plurality of pieces of vehicle control software (step S3). When the ECU 160 receives a plurality of pieces of vehicle control software, the ECU 160 stores and holds the plurality of pieces of vehicle control software in the NVM 161 (step S4). Thus, the NVM 161 stores the plurality of pieces of vehicle control software (see FIG. 3A). The NVM 161 may store a plurality of pieces of vehicle control software in advance without the ECU 160 executing the processes of step S1 and step S3.

After the ECU 160 stores and holds the plurality of pieces of vehicle control software, the electrically-powered vehicle 100 supplements electric power from any one of the first charging station 310 and the second charging station 320. When the ECU 160 supplements electric power, the ECU 160 checks the station model ID of the first charging station 310 or second charging station 320 (step S5). For example, when the electrically-powered vehicle 100 is parked in a parking place of a facility in which the first charging station 310 is installed, the ECU 160 checks the station model ID of the first charging station 310 through wired communication via a charging cable. When the electrically-powered vehicle 100 is parked in a parking place of a place where the second charging station 320 is installed, the ECU 160 checks the station model ID of the second charging station 320 through wired communication via a charging cable.

When the first charge controller 319 of the first charging station 310 is requested to check the station model ID from the electrically-powered vehicle 100, the first charge controller 319 provides notification about the station model ID and the version of control software to the electrically-powered vehicle 100 (step S6). For example, the first charge controller 319 identifies the latest control software from among the plurality of pieces of control software stored in the first charge controller 319 (more specifically, the NVM 319m) and provides notification about the version of the identified control software together with the station model ID of the first charge controller 319. In the present embodiment, the first charge controller 319 provides notification about version "V2" of control software together with station model ID "S1" (see FIG. 10A).

On the other hand, when the second charge controller 329 of the second charging station 320 is requested to check the station model ID from the electrically-powered vehicle 100, the second charge controller 329 provides notification about the station model ID and the version of control software to the electrically-powered vehicle 100 (step S7). For example, the second charge controller 329 identifies the latest control software from among the plurality of pieces of control software stored in the second charge controller 329 (more specifically, the NVM 329m) and provides notification about the version of the identified control software together with the station model ID of the second charge controller 329. In the present embodiment, the second charge controller 329 provides notification about version "V2" of control software together with station model ID "S2" (see FIG. 11A).

The ECU 160 may check the model ID by using a distance on map information based on location information on the current location of the electrically-powered vehicle 100 identified by the GPS receiver 172 and location information on the first charging station 310 or the second charging station 320. For example, when the second charging station 320 is present in a close-in range of the electrically-powered vehicle 100, the ECU 160 is able to check model ID "S2".

When notification about the station model ID and the version of control software is provided, the ECU 160 determines whether there is vehicle control software associated with the first charging station 310 or the second charging station 320 (step S8) as shown in FIG. 12. For example, when notification about version "V2" of control software is provided from the second charging station 320 together with station model ID "S2", the ECU 160 identifies a combination of vehicle model ID "E1" and station model ID "S2" based on the first support table of the electrically-powered vehicle 100 (see FIG. 3B). When the ECU 160 identifies the combination, the ECU 160 identifies a second management slip associated with the identified combination and checks for vehicle control software having compatibility with version "V2" of control software associated with station model ID "S2" (see FIG. 3C). In other words, the ECU 160 checks for the version of vehicle control software associated with compatibility "YES" based on the identified second management slip. In the present embodiment, compatibility "NO" is associated with version "V1" and version "V3" of vehicle control software. On the other hand, compatibility "YES" is associated with version "V2" of vehicle control software, and the NVM 161 stores the vehicle control software of version "V2". Therefore, the ECU 160 determines that there is the associated vehicle control software (YES in step S8).

When there is the associated vehicle control software, the ECU 160 skips the processes of step S9, step S10, and step S12 (described later) and selects the associated vehicle control software (step S13). In the present embodiment, the ECU 160 switches from the vehicle control software of the latest version "V3" to the vehicle control software of version "V2" and selects the vehicle control software. Thus, the vehicle control software of the electrically-powered vehicle 100 is able to ensure compatibility with the control software of version "V2" of the second charging station 320.

On the other hand, when there is no associated vehicle control software in the process of step S8 (NO in step S8), the ECU 160 accesses the vehicle management server 210 and determines whether the associated vehicle control software is able to be acquired from the vehicle management server 210 (step S9). For example, when compatibility "NO" is associated with version "V1", version "V2", and version "V3" of vehicle model ID "E1", associated with version "V2" of station model ID "S2" and compatibility "YES" is associated with version "V4" (not shown) in FIG. 3C, the NVM 161 may not store the vehicle control software of version "V4". In this case, the ECU 160 determines that there is no associated vehicle control software and determines whether the associated vehicle control software is able to be acquired from the vehicle management server 210.

When the associated vehicle control software is able to be acquired because the vehicle management server 210 has the associated vehicle control software (YES in step S9), the ECU 160 makes a request of the vehicle management server 210 for the associated vehicle control software (step S10). In the present embodiment, since the vehicle control SW storage unit 215 stores vehicle model ID "E1" and version "V4" (see FIG. 6), the ECU 160 makes a request of the vehicle management server 210 for the associated vehicle control software.

When the associated vehicle control software is requested, the vehicle control SW management unit 217 transmits the associated vehicle control software to the electrically-powered vehicle 100 (step S11). When the associated vehicle control software is transmitted, the ECU 160 receives and acquires the associated vehicle control software (step S12). When the ECU 160 acquires the associated vehicle control software, the ECU 160 stores and holds the associated vehicle control software in the NVM 161.

When the associated vehicle control software is held, the ECU 160 selects the associated vehicle control software in the process of step S13. In other words, the ECU 160 switches from the vehicle control software of the latest version "V3" to the vehicle control software of version "V4" and selects the vehicle control software. As described above, when compatibility "YES" is associated with version "V4" of vehicle model ID "E1", associated with version "V2" of station model ID "S2", the vehicle control software of the electrically-powered vehicle 100 is able to ensure compatibility with the control software of version "V2" of the second charging station 320 by the ECU 160 selecting the vehicle control software of version "V4".

When the associated vehicle control software is not able to be acquired because the vehicle management server 210 does not have the associated vehicle control software (NO in step S9), the ECU 160 selects vehicle control software with a high possibility of charge in the process of step S13. For example, when compatibility "NO" is associated with version "V1", version "V2", version "V3", and version "V4" (not shown) of vehicle model ID "E1", associated with version "V2" of station model ID "S2" in FIG. 3C, the ECU 160 selects the vehicle control software of any one version of vehicle model ID "E1" with which compatibility "YES" is associated regardless of station model ID "S2". For example, in FIG. 3C, the ECU 160 selects the vehicle control software of version "V1" of vehicle model ID "E1", associated with version "V1" of station model ID "S2". The NVM 161 stores the vehicle control software of version "V1" (see FIG. 3A), so the ECU 160 is able to select the vehicle control software.

The case where notification about version "V2" of control software is provided from the second charging station 320 together with station model ID "S2" has been described as an example. The case where notification about version "V2" of control software is provided from the first charging station 310 together with station model ID "S1" is basically similar to the case of the second charging station 320, so the description thereof is omitted.

When the vehicle control software is selected in the process of step S13, the ECU 160 transmits charging data such as a charging start request to the first charging station 310 or the second charging station 320 (step S14). When the electrically-powered vehicle 100 is parked in a parking place of a facility in which the first charging station 310 is installed, the ECU 160 transmits charging data to the first charging station 310 through wired communication via a charging cable. When the electrically-powered vehicle 100 is parked in a parking place of a place where the second charging station 320 is installed, the ECU 160 transmits charging data to the second charging station 320 through wired communication via a charging cable.

When the charging data is transmitted to the first charging station 310, the first charge controller 319 receives the charging data (step S15). When the charging data is transmitted to the second charging station 320, the second charge controller 329 receives the charging data (step S16). When the first charge controller 319 receives the charging data, the first charge controller 319 transmits output data such as maximum output information to the electrically-powered vehicle 100 (step S17). When the second charge controller 329 receives the charging data, the second charge controller 329 transmits output data to the electrically-powered vehicle 100 (step S18).

When the output data is transmitted from the first charging station 310 or the second charging station 320, the ECU 160 receives the output data transmitted from the first charging station 310 or the second charging station 320 (step S19). When the ECU 160 receives the output data, electric power begins to be supplied from the first charging station 310 or the second charging station 320 to the electrically-powered vehicle 100. In other words, charging of the electrically-powered vehicle 100 starts. The ECU 160 selects vehicle control software having compatibility with the control software of the first charging station 310 or the second charging station 320 through the process of step S13, so it is possible to avoid a situation in which control software and vehicle control software do not support each other.

Second Embodiment

Figure 14:
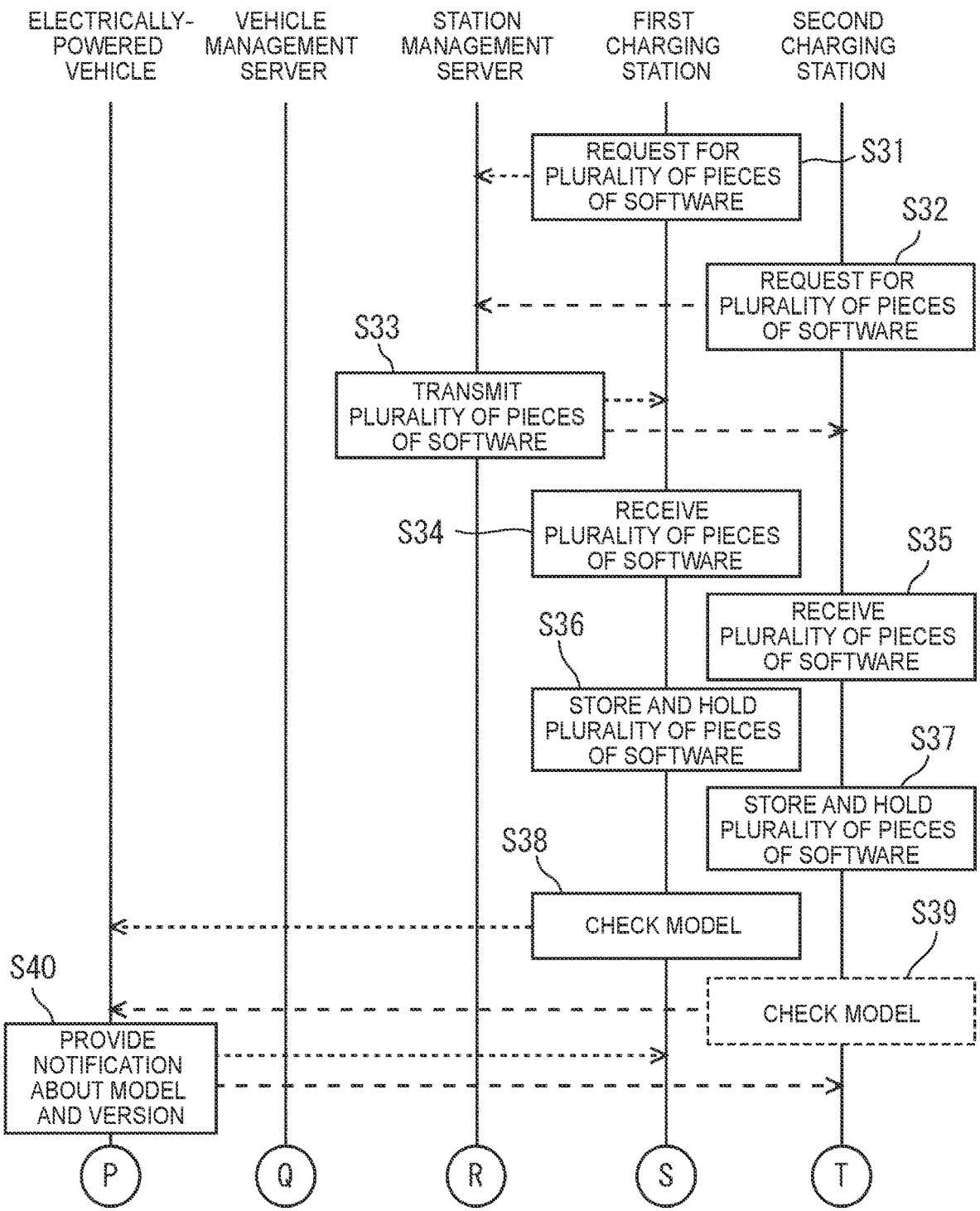
FIG. 14 is a process sequence diagram (part 1) showing an example of the operation of the energy supply system according to a second embodiment.

The operation of the energy supply system ST according to a second embodiment will be described with reference to FIG. 14 and FIG. 15. In FIG. 14 and FIG. 15, a continuation of process is represented by the character "P", the character "Q", or the like.

Initially, as shown in FIG. 14, the first charge controller 319 of the first charging station 310 makes a request of the station management server 220 for a plurality of pieces of control software (step S31). The second charge controller 329 of the second charging station 320 makes a request of the station management server 220 for a plurality of pieces of control software (step S32). The first charge controller 319 and the second charge controller 329 each may make a request individually without making a request for a plurality of pieces of control software collectively.

For example, the first charge controller 319 makes a request for a plurality of pieces of control software by transmitting information including a station model ID assigned to the first charge controller 319 and a date of release to the station management server 220 as a second transmission target condition. In the present embodiment, the first charge controller 319 transmits information including station model ID "S1" and a date of release "Jan. 8, 2020" to a date of release "Nov. 8, 2020" as a second transmission target condition. The second charge controller 329 is similar to the case of the first charge controller 319, so the description is omitted.

When the station control SW management unit 227 of the station management server 220 is requested for a plurality of pieces of control software, the station control SW management unit 227 transmits the plurality of pieces of control software (step S33). When the second transmission target condition is transmitted from the first charging station 310, the station control SW management unit 227 accesses the station control SW storage unit 225 and extracts the control software that satisfies the second transmission target condition from the control software management table (see FIG. 8) of the station management server 220. In the present embodiment, the station control SW management unit 227 extracts the control software of version "V1", version "V2", and version "V3" of station model ID "S1". The station control SW management unit 227 transmits the extracted pieces of control software to the first charging station 310. When the second transmission target condition is transmitted from the second charging station 320, the station control SW management unit 227 transmits the extracted pieces of control software to the second charging station 320 as in the case where the second transmission target condition is transmitted from the first charging station 310.

When a plurality of pieces of control software is transmitted to the first charging station 310, the first charge controller 319 receives the plurality of pieces of control software (step S34). When a plurality of pieces of control software is transmitted to the second charging station 320, the second charge controller 329 receives the plurality of pieces of control software (step S35). When the first charge controller 319 receives the plurality of pieces of control software, the first charge controller 319 stores and holds the plurality of pieces of control software in the NVM 319*m* (step S36). Thus, the NVM 319*m* stores the plurality of pieces of control software (see FIG. 10A).

When the second charge controller 329 receives the plurality of pieces of control software, the second charge controller 329 stores and holds the plurality of pieces of control software in the NVM 329*m* (step S37). Thus, the NVM 329*m* stores the plurality of pieces of control software (see FIG. 11A). Alternatively, the NVM 319*m* may store the plurality of pieces of control software in advance without the first charge controller 319 executing the processes of step S31 and step S34. The NVM 329*m* may store the plurality of pieces of control software in advance without the second charge controller 329 executing the processes of step S32 and step S35.

After the first charge controller 319 and the second charge controller 329 store and hold the plurality of pieces of control software, the first charging station 310 and the second charging station 320 supply electric power to the electrically-powered vehicle 100 independently of each other. When the first charge controller 319 supplies electric power, the first charge controller 319 checks the vehicle model ID of the electrically-powered vehicle 100 (step S38). When the second charge controller 329 supplies electric power, the second charge controller 329 checks the vehicle model ID of the electrically-powered vehicle 100 (step S39). For example, when the electrically-powered vehicle 100 is parked in a parking place of a facility in which the first charging station 310 is installed, the first charge controller 319 checks the vehicle model ID of the electrically-powered vehicle 100 through wired communication via a charging cable. When the electrically-powered vehicle 100 is parked in a parking place of a place where the second charging station 320 is installed, the second charge controller 329 checks the vehicle model ID of the electrically-powered vehicle 100 through wired communication via a charging cable.

When the electrically-powered vehicle 100 is requested to check the vehicle model ID, the ECU 160 provides notification about the vehicle model ID and the version of the control software (step S40). When, for example, the electrically-powered vehicle 100 is requested to check the vehicle model ID from the first charge controller 319, the ECU 160 identifies the latest vehicle control software from among the plurality of pieces of vehicle control software stored in the ECU 160 (more specifically, the NVM 161). The ECU 160 provides notification about the version of the identified vehicle control software to the first charging station 310 together with the vehicle model ID of the electrically-powered vehicle 100. In the present embodiment, the ECU 160 provides notification about version "V3" of control software together with vehicle model ID "E1" (see FIG. 3A). When the electrically-powered vehicle 100 is requested to check the vehicle model ID from the second charge controller 329, as in the case where the electrically-powered vehicle 100 is requested to check the vehicle model ID from the first charge controller 319, the ECU 160 provides notification about the version of the vehicle control software to the second charging station 320 together with the vehicle model ID of the electrically-powered vehicle 100.

When the notification about the vehicle model ID and the version of the vehicle control software is provided to the first charging station 310, the first charge controller 319 determines whether there is control software associated with the electrically-powered vehicle 100 (step S41) as shown in FIG. 15. For example, when notification about version "V3" of vehicle control software is provided from the electrically-powered vehicle 100 together with vehicle model ID "E1", the first charge controller 319 identifies a combination of station model ID "S1" and vehicle model ID "E1" based on the first support table of the first charge controller 319 (see FIG. 10B). When the first charge controller 319 identifies the combination, the first charge controller 319 identifies a second management slip associated with the identified combination and checks for control software having compatibility with version "V3" of vehicle control software, associated with vehicle model ID "E1" (see FIG. 10C). In other words, the first charge controller 319 checks for the version of control software, associated with compatibility "YES" based on the identified second management slip. In the present embodiment, compatibility "NO" is associated with version "V2" of control software. On the other hand, compatibility "YES" is associated with version "V1" of control software, and the NVM 161 stores the control software of version "V1". Therefore, the first charge controller 319 determines that there is the associated control software (YES in step S41).

When there is the associated control software, the first charge controller 319 skips the processes of step S42, step S43, and step S45 (described later) and selects the associated control software (step S46). In the present embodiment, the first charge controller 319 switches the control software of the latest version "V2" to the control software of version "V1" and selects the control software. Thus, the control software of version "V1" of the first charging station 310 is able to ensure compatibility with the vehicle control software of the electrically-powered vehicle 100.

On the other hand, when there is no associated control software (NO in step S41), the first charge controller 319 accesses the station management server 220 and determines whether the associated control software is able to be acquired from the station management server 220 (step S42). For example, when compatibility "NO" is associated with version "V1" and version "V2" of station model ID "S1" associated with version "V3" of vehicle model ID "E1" and compatibility "YES" is associated with version "V3" (not shown) in FIG. 10C, the NVM 319m may not store the control software of version "V3". In this case, the first charge controller 319 determines that there is no associated control software and determines whether the associated control software is able to be acquired from the station management server 220.

When the associated control software is able to be acquired because the station management server 220 has the associated control software (YES in step S42), the first charge controller 319 makes a request of the station management server 220 for the associated control software (step S43). In the present embodiment, the station control SW storage unit 225 stores the control software including station model ID "S1" and version "V3" (see FIG. 8), so the first charge controller 319 makes a request of the station management server 220 for the associated control software.

When the associated control software is requested, the vehicle control SW management unit 217 transmits the associated control software to the electrically-powered vehicle 100 (step S44). When the associated control software is transmitted, the first charge controller 319 receives and acquires the associated control software (step S45). When the first charge controller 319 acquires the associated control software, the first charge controller 319 stores and holds the associated control software in the NVM 319m.

When the associated control software is held, the first charge controller 319 selects the associated control software in the process of step S46. In other words, the first charge controller 319 switches the control software of the latest version "V2" to the control software of version "V3" and selects the control software. As described above, when compatibility "YES" is associated with version "V3" of station model ID "S1", associated with version "V3" of vehicle model ID "E1", the control software of version "V3" of the first charging station 310 is able to ensure compatibility with the vehicle control software of the electrically-powered vehicle 100 by the first charge controller 319 selecting the control software of version "V3".

When the associated control software is not able to be acquired because the station management server 220 does not have the associated control software (NO in step S42), the first charge controller 319 selects control software with a high possibility of supply in the process of step S46. For example, when compatibility "NO" is associated with version "V1" and version "V2" of station model ID "S1" associated with version "V3" of vehicle model ID "E1" in FIG. 10C, the first charge controller 319 selects the control software of any one version of station model ID "S1", associated with compatibility "YES". For example, in FIG. 10C, the first charge controller 319 selects the control software of version "V2" of station model ID "S1", associated with version "V2" of vehicle model ID "E1". Since the NVM 319m stores the control software of version "V2" (see FIG. 10A), the first charge controller 319 is able to select the control software.

The case of the first charging station 310 has been described as an example, and the case of the second charging station 320 is basically similar to the case of the first charging station 310. Therefore, various processes of the second charging station 320, corresponding to the processes of step S41, step S42, step S43, step S44, step S45, and step S46 in FIG. 15, are omitted from the drawing except the process of step S47, and the detailed description thereof is omitted.

When the control software is selected in the process of step S46, the ECU 160 of the electrically-powered vehicle 100 transmits charging data such as a charging start request to the first charging station 310 or the second charging station 320 (step S48). When the charging data is transmitted to the first charging station 310, the first charge controller 319 receives the charging data (step S49). When the charging data is transmitted to the second charging station 320, the second charge controller 329 receives the charging data (step S50).

When the first charge controller 319 receives the charging data, the first charge controller 319 transmits output data such as maximum output information to the electrically-powered vehicle 100 (step S51). When the second charge controller 329 receives the charging data, the second charge controller 329 transmits output data to the electrically-powered vehicle 100 (step S52). When the output data is transmitted from the first charging station 310 or the second charging station 320, the ECU 160 receives the output data transmitted from the first charging station 310 or the second charging station 320 (step S53).

When the ECU 160 receives the output data, electric power begins to be supplied from the first charging station 310 or the second charging station 320 to the electrically-powered vehicle 100. In other words, charging of the electrically-powered vehicle 100 starts. Since the first charge controller 319 or the second charge controller 329 selects control software having compatibility with vehicle control software through the process of step S46, it is possible to avoid a situation in which vehicle control software and control software do not support each other.

The embodiments of the present disclosure are described in detail; however, the applicable embodiment is not limited to the above-described specific embodiments. Various modifications or alterations are applicable within the scope of the purport of the present disclosure described in the appended claims.

For example, in the first and second embodiments, the first charging station 310 and the second charging station 320 are described as examples of a supply apparatus and an energy supply apparatus. Alternatively, when the electrically-powered vehicle 100 is a fuel-cell vehicle, a hydrogen station that supplies hydrogen as energy may be employed instead of the charging station 300. With such an embodiment, it is possible to avoid a situation in which there is no compatibility between control software for controlling supply of hydrogen and vehicle control software for controlling supplement of hydrogen.

In the first embodiment, the electrically-powered vehicle 100 receives a vehicle control program via wireless communication WL. Alternatively, the electrically-powered vehicle 100 may, for example, receive a vehicle control program via wired communication, such as the first communication line 314 included in the charging cable extending from the first charging station 310.

With regard to the above-described embodiments, the following supplemental note will be described.

Addendum 1

An energy supply method in which a plurality of supply apparatuses supplies energy independently to an electrically-powered vehicle that supplements the energy includes holding, by a controller of the electrically-powered vehicle, a plurality of pieces of vehicle control software, associated with at least two of pieces of control software of each of the plurality of supply apparatuses, and when the energy is supplemented from any one supply apparatus of the plurality of supply apparatuses, selecting, by the controller, vehicle control software associated with control software of the any one supply apparatus from among the plurality of pieces of vehicle control software.

What is claimed is:

1. An electrically-powered vehicle that supplements energy independently from each of a plurality of supply apparatuses that supply the energy, the electrically-powered vehicle comprising a controller configured to
hold a plurality of pieces of vehicle control software of the electrically-powered vehicle with different versions from each other, the plurality of pieces of vehicle control software including software for controlling an operation related to supplement of energy,
hold compatibility data associated with each model of the plurality of supply apparatuses, the compatibility data indicating compatibility between each version of a plurality of pieces of vehicle control software and each version of a plurality of pieces of control software for the plurality of supply apparatuses,
select, based on the compatibility data associated with a model of a supply apparatus connected to the electrically-powered vehicle, one piece of vehicle control software having a version that is compatible with a version of control software for a model of the connected supply apparatus from among the plurality of pieces of vehicle control software,
select, when the controller does not hold the vehicle control software having a version that is compatible with a version of control software for a model of the connected supply apparatus, one piece of vehicle control software having a version that is compatible with any version of control software for a model of the connected supply apparatus, and
control an operation related to supplement of energy by the selected vehicle control software, wherein
the controller is configured to acquire and hold a plurality of pieces of vehicle control software satisfying a first extraction condition from a server capable of communicating with the electrically-powered vehicle, the first extraction condition including at least one of a model of the electrically-powered vehicle and date of release assigned to the electrically-powered vehicle.

2. The electrically-powered vehicle according to claim 1, wherein the controller is configured to, when the controller does not hold the vehicle control software having a version that is compatible with a version of control software for a model of the connected supply apparatus, acquire and select the vehicle control software having a version that is compatible with a version of control software for a model of the connected supply apparatus from the server.

3. The electrically-powered vehicle according to claim 1, wherein:
the electrically-powered vehicle includes a secondary battery as a power supply; and
the plurality of supply apparatuses is configured to supply electric power as the energy.

4. The electrically-powered vehicle according to claim 1, wherein:
the electrically-powered vehicle includes a fuel cell as a power supply, and the fuel cell uses hydrogen as a fuel; and
the plurality of supply apparatuses is configured to supply the hydrogen as the energy.

5. An energy supply apparatus that individually supplies energy to a plurality of electrically-powered vehicles, the energy supply apparatus comprising a control unit configured to
hold a plurality of pieces of control software of the energy supply apparatus with different versions from each other, the plurality of pieces of control software including software for controlling an operation to supply of the energy,
hold compatibility data associated with each model of the plurality of electrically-powered vehicles, the compatibility data indicating compatibility between each version of a plurality of pieces of control software and each version of a plurality of pieces of vehicle control software for the plurality of electrically-powered vehicles,
select, based on the compatibility data associated with a model of an electrically-powered vehicle connected to the energy supply apparatus, one piece of control software having a version that is compatible with a version of vehicle control software for a model of the connected electrically-powered vehicle from among the plurality of pieces of control software, select, when the control unit does not hold the control software having a version that is compatible with a version of vehicle control software for a model of the connected electrically-powered vehicle, one piece of control software having a version that is compatible with any version of vehicle control software for a model of the connected electrically-powered vehicle, and control an operation related to supply of energy by the selected control software, wherein the control unit is configured to acquire and hold a plurality of pieces of control software satisfying a second extraction condition from a server capable of communicating with the energy supply apparatus, the second extraction condition including at least one of a model of the energy supply apparatus and date of release assigned to the energy supply apparatus.

6. The energy supply apparatus according to claim 5, wherein the control unit is configured to, when the control unit does not hold the control software having a version that is compatible with a version of vehicle control software for a model of the connected electrically-powered vehicle, acquire and select the control software having a version that is compatible with a version of vehicle control software for a model of the connected electrically-powered vehicle from the server.

7. An energy supply system comprising:
a plurality of supply apparatuses configured to supply energy; and
an electrically-powered vehicle configured to supplement the energy independently from each of the plurality of supply apparatuses, wherein
the electrically-powered vehicle includes a controller configured to
hold a plurality of pieces of vehicle control software of the electrically-powered vehicle with different versions from each other, the plurality of pieces of vehicle control software including software for controlling an operation related to supplement of energy,
hold compatibility data associated with each model of the plurality of supply apparatuses, the compatibility data indicating compatibility between each version of a plurality of pieces of vehicle control software and each version of a plurality of pieces of control software for the plurality of supply apparatuses,
select, based on the compatibility data associated with a model of a supply apparatus connected to the electrically-powered vehicle, one piece of vehicle control software having a version that is compatible with a version of control software for a model of the connected supply apparatus from among the plurality of pieces of vehicle control software,
select, when the controller does not hold the vehicle control software having a version that is compatible with a version of control software for a model of the connected supply apparatus, one piece of vehicle control software having a version that is compatible with any version of control software for a model of the connected supply apparatus, and
control an operation related to supplement of energy by the selected vehicle control software, wherein
the controller is configured to acquire and hold a plurality of pieces of vehicle control software satisfying a first extraction condition from a server capable of communicating with the electrically-powered vehicle, the first extraction condition including at least one of a model of the electrically-powered vehicle and date of release assigned to the electrically-powered vehicle.

8. The energy supply system according to claim 7, further comprising a server capable of communicating with the electrically-powered vehicle, wherein
the controller is configured to, when the controller does not hold the vehicle control software having a version that is compatible with a version of control software for a model of the connected supply apparatus, acquire and select the vehicle control software having a version that is compatible with a version of control software for a model of the connected supply apparatus from the server.

9. The electrically-powered vehicle according to claim 1, wherein the controller is configured to
acquire and hold new-version vehicle control software for a model of the electrically-powered vehicle,
update old-version vehicle control software installed on the electrically-powered vehicle to the new-version vehicle control software in a state where the old-version vehicle control software is held, and
select the vehicle control software from among the plurality of pieces of vehicle control software including the new-version vehicle control software and one or more old-version vehicle control software.

10. The energy supply apparatus according to claim 5, wherein the control unit is configured to
acquire and hold new-version control software for a model of the energy supply apparatus,
update old-version control software installed on the energy supply apparatus to the new-version control software in a state where the old-version control software is held,
select the control software from among the plurality of pieces of control software including the new-version control software and one or more old-version control software.

* * * * *